United States Patent
Yoshimura et al.

(10) Patent No.: US 6,556,241 B1
(45) Date of Patent: Apr. 29, 2003

(54) REMOTE-CONTROLLED CAMERA-PICTURE BROADCAST SYSTEM

(75) Inventors: Naoto Yoshimura, Tokyo (JP); Hideo Ohno, Tokyo (JP); Hisashi Okano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/124,909

(22) Filed: Jul. 30, 1998

(30) Foreign Application Priority Data

Jul. 31, 1997 (JP) .............................................. 9-206167

(51) Int. Cl.⁷ ............................................... H04N 5/232
(52) U.S. Cl. ................................ 348/211.99; 348/211.3; 348/211.11; 348/207.1; 348/207.11; 348/143
(58) Field of Search ............................. 348/14.08, 14.05, 348/211, 212, 213, 552, 143, 15

(56) References Cited

U.S. PATENT DOCUMENTS

| | | | | |
|---|---|---|---|---|
| 5,793,415 A | * | 8/1998 | Gregory et al. | 348/14.1 |
| 5,943,046 A | * | 8/1999 | Cave et al. | 348/552 |
| 6,067,571 A | * | 5/2000 | Igarashi et al. | 348/14.1 |
| 6,133,941 A | * | 10/2000 | Ono | 348/14.05 |

FOREIGN PATENT DOCUMENTS

| | | | | |
|---|---|---|---|---|
| EP | 0 604 009 A1 | | 6/1994 | |
| EP | 0 715 466 A2 | | 6/1996 | |
| EP | 0715466 A2 | * | 6/1996 | ............ H04N/7/15 |
| JP | 8-265742 | | 10/1996 | |
| JP | 10-210450 | | 8/1998 | |

* cited by examiner

Primary Examiner—Wendy R. Garber
Assistant Examiner—Matthew L Rosendale
(74) Attorney, Agent, or Firm—Whitham, Curtis & Christofferson, P.C.

(57) ABSTRACT

A remote-controlled camera-picture broadcast system is provided, which decreases the cost of hardware and network for the use of a lot of unspecified users. This system is comprised of a camera apparatus, a camera controller, a camera server connected to the camera controller through a first network, and clients connected to the camera server through a second network. Each of the clients transmits an operation demand for the camera apparatus to the camera server through the second network according to an input of a user. The camera server receives the operation demand from the client into which the input of the user is applied, and transmits an operation command corresponding to the operation demand to the camera controller through the first network. The camera controller controls the camera apparatus according to the operation command from the camera server so that the camera apparatus acquires a picture and produces a video signal of the picture. The camera controller receives the video signal of the picture produced by the camera apparatus, converts the video signal to a picture data, and transmits the picture data to the camera server through the first network. The camera server transmits the picture data through the second network to the client from which the operation demand has been transmitted, thereby displaying the picture of the picture data on a screen.

7 Claims, 22 Drawing Sheets

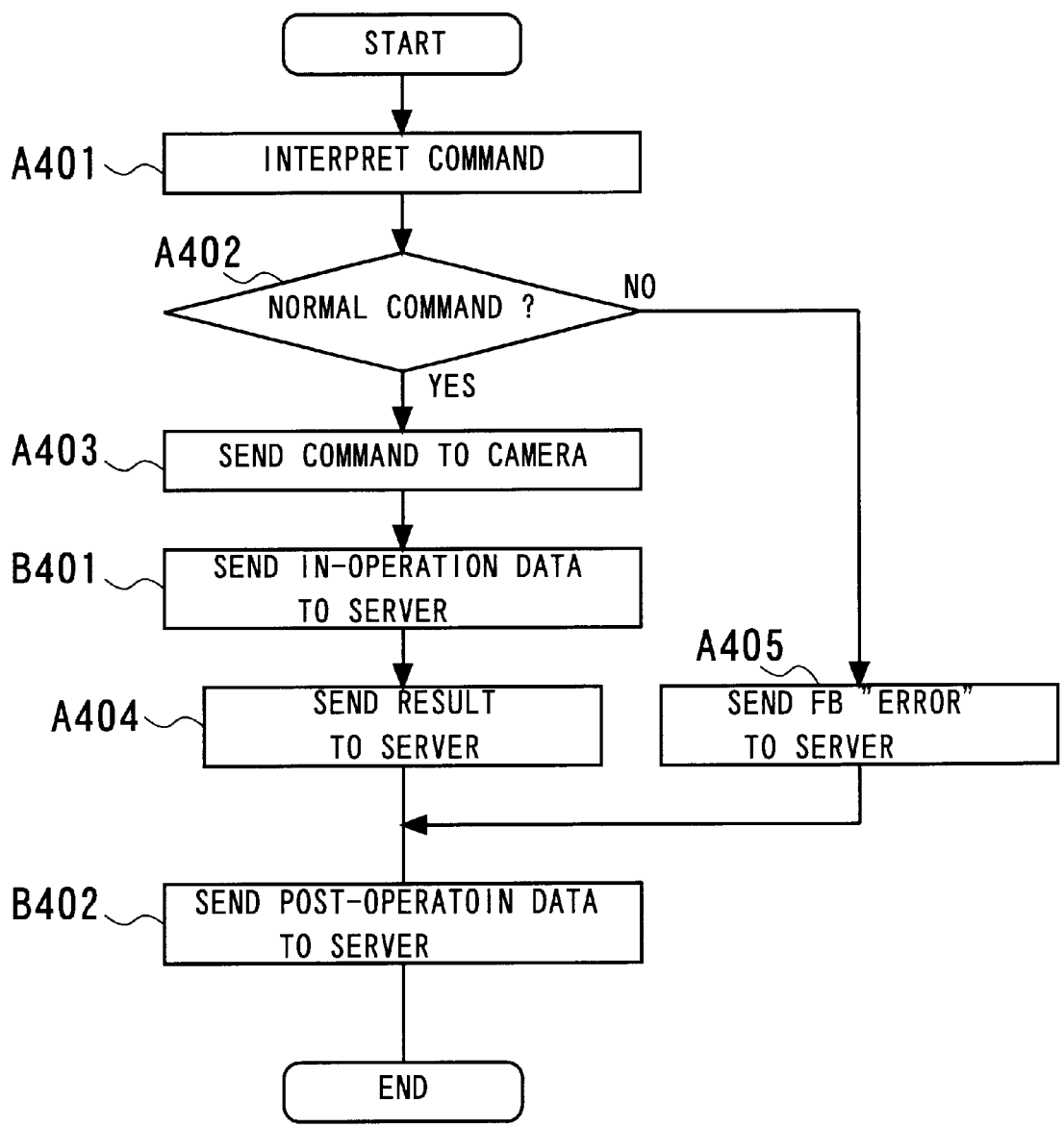

REMOTE-CONTROLLED CAMERA-PICTURE BROADCAST SYSTEM

BACKGROUND OF THE INVENTION

1. Field of the Invention

The present invention relates to a remote-controlled camera-picture broadcast system and, more particularly, to a remote-controlled camera-picture broadcast system that facilitates use by a potentially large plurality of unspecified users through a computer network and which is applicable to a video monitoring system.

2. Description of the Prior Art

Conventionally, the remote-controlled camera-picture broadcast systems of this sort have been used to acquire a picture by operating or controlling at least one video camera mounted at a distant place through a computer network.

An example of the conventional remote-controlled camera-picture broadcast systems is disclosed in the Japanese Non-Examined Patent Publication No. 8-265742 published in 1996, which is comprised of a first workstation to which a video camera is connected, a second workstation, a third workstation to which a display monitor is connected, and a fourth workstation to which a display monitor is connected. These four workstations are interconnected together by a network.

Picture transmission/reception software and camera control server software are installed into the first workstation. Camera management server software for managing the video camera is installed into the second workstation. Picture transmission/reception software and camera control client software are installed into the third workstation. Picture transmission/reception software and camera control client software are installed into the fourth workstation.

The camera management server software installed into the second workstation communicates with the camera control server installed into the first workstation to update or renew the state of the video camera connected to the first workstation at any time. Also, the camera management server software notifies regularly the camera control client software installed into the third and fourth workstations of the camera state.

If the user or operator of the third (or fourth) workstation operates the video camera connected to the first workstation, the camera control client software in the third (or fourth) workstation issues a request of access to the camera management server software in the second workstation exclusively managing the camera prior to transmission of a camera operation command. If this request of access is permitted by the camera management server software in the second workstation, the camera management server software transmits a camera operation command directly to the camera control server software in the first workstation to which the video camera is connected. In response to this camera operation command, the picture transmission/reception software in the first workstation transmits the picture information acquired by the video camera directly to the picture transmission/reception software in the third (or fourth) workstation.

If this request of access is not permitted by the camera management server software, the camera management server software transmits a message notifying the refusal of access to the camera control client software in the third (or fourth) workstation.

With the conventional remote-controlled camera-picture broadcast system disclosed in the Japanese Non-Examined Patent Publication No. 8-265742 as described above, however, there are the following three problems.

A first problem is that the cost of the hardware and the network becomes high to ensure or secure the satisfactory performance of the conventional broadcast system even for the use of a lot of unspecified users. The is caused by the following reason.

The use of a lot of unspecified users tends to be concentrated on the camera control server software in the first workstation which is usually mounted on a distant place. Also, the interconnection among the camera control server software, the camera management server software, and the camera control client software need to be always secured for the purpose of the inquiry and notice of the state of the video camera. These facts require the high performance of not only the camera control server software and the first workstation but also the network connected thereto, resulting in high cost of the hardware and the network.

A second problem is that the necessity of maintenance of the camera control server software and the first workstation becomes high in order to ensure the stable operation for a lot of unspecified users. This requires the camera control server software and the first workstation to be located at a place facilitating maintenance, which limits the location of the video camera also.

The second problem is caused by the fact that the camera control server software and the first workstation tend to operate unstably due to load change and/or unjust access since the broadcast system is used by a lot of unspecified users.

A third problem is that the overhead tends to be large on use by a lot of unspecified users, the reason of which is as follows.

If the user of the third workstation operates the video camera, a request for access needs to be transmitted by the camera control client software in the third workstation to the camera management server software in the second workstation in order to acquire the access authority. After the user acquires the access authority, a camera control command is transmitted by the camera management server software in the second workstation to the camera server software in the first workstation according to the access authority, thereby operating the camera connected to the first workstation.

Accordingly, the waiting time for this camera operation from the instruction input by the user to the start of the camera operation tends to be long. Especially, when the transmission speed of the computer network is not high, the waiting time will be longer.

Also, to ensure the camera operation, the holding time of the access authority needs to be set according to the transmission speed of the network. Specifically, the holding time of the access authority needs to be set longer if the transmission speed of the network is low.

SUMMARY OF THE INVENTION

Accordingly, an object of the present invention is to provide a remote-controlled camera-picture broadcast system that decreases the cost of hardware and network for the use of a lot of unspecified users.

Another object of the present invention is to provide remote-controlled camera-picture broadcast system that avoids a need for high performance of a camera controller and a network connected thereto.

Still another object of the present invention is to provide a remote-controlled camera-picture broadcast system that decreases the necessity of maintenance of a camera controller located at a distant place.

A further object of the present invention is to provide a remote-controlled camera-picture broadcast system that lowers the overhead even on use by a lot of unspecified users.

The above objects together with others not specifically mentioned will become clear to those skilled in the art from the following description.

A remote-controlled camera-picture broadcast system according to the present invention is comprised of

- a camera apparatus for acquiring a picture and producing a video signal of the picture,
- a camera controller for controlling the camera apparatus,
- a camera server connected to the camera controller through a first network, and
- clients connected to the camera server through a second network.

Each of the clients transmits an operation demand for the camera apparatus to the camera server through the second network according to an input of a user.

The camera server receives the operation demand thus transmitted from the client into which the input of the user is applied, and transmits an operation command corresponding to the operation demand thus received to the camera controller through the first network.

The camera controller controls the camera apparatus according to the operation command thus transmitted from the camera server so that the camera apparatus acquires a picture and produces a video signal of the picture.

The camera controller receives the video signal of the picture produced by the camera apparatus, converts the video signal to a picture data, and transmits the picture data to the camera server through the first network.

The camera server transmits the picture data thus received through the second network to the client from which the operation demand has been transmitted, thereby displaying the picture of the picture data on a screen.

With the remote-controlled camera-picture broadcast system according to the present invention, the camera server is connected to the clients through the second network and is connected to the camera controller through the first network. This means that the camera controller is not directly connected to the clients, which is unlike the previously-described conventional remote-controlled camera-picture broadcast system.

Also, the operation demands transmitted from the clients are received by the camera server provided between the clients and the camera controller and then, the operation commands corresponding to the operation demands thus received are transmitted to the camera controller by the camera server as necessary. Thus, there is no possibility that an infinitely increasing load is applied to the camera controller and the first network connected thereto even when the use of a lot of unspecified users is concentrated on this system.

Moreover, since the inquiry about the state of the camera apparatus occurs synchronized with the operation demands transmitted from the clients, there is no need to always or continuously interconnect the camera controller with the camera sever through the first network.

As a result, the camera controller and the first network connected thereto need not have high performance, which decreases the cost of hardware and network for the use of a lot of unspecified users.

Because the camera controller is not directly utilized by the clients, the camera controller does not tend to operate unstably due to load change and/or unjust access even if the broadcast system is used by a lot of unspecified users.

Thus, the necessity of maintenance of the camera controller, which is usually located at a distant place, is decreased.

Further, the access authority is acquired to be synchronized with the transmission of the operation demands transmitted from the clients. Also, the holding time of the access authority is able to be limited within a short period when the camera apparatus is actually operated by the operation commands.

Accordingly, the overhead is lowered even on use by a lot of unspecified users.

In a preferred embodiment of the system according to the present invention, each of the first and second networks is a computer network such as a so-called Local Area Network (LAN).

In another preferred embodiment of the system according to the present invention, the first network is a computer network such as a so-called Local Area Network (LAN) and the second network is the Internet.

BRIEF DESCRIPTION OF THE DRAWINGS

In order that the present invention may be readily carried into effect, it will now be described with reference to the accompanying drawings.

FIG. 12 is a flow chart showing the operation of the camera controller of the remote-controlled camera-picture broadcast system according to the third embodiment of FIGS. 10A, 10B, and 12.

DETAILED DESCRIPTION OF THE PREFRERRED EMBODIMENTS

Figure 1:
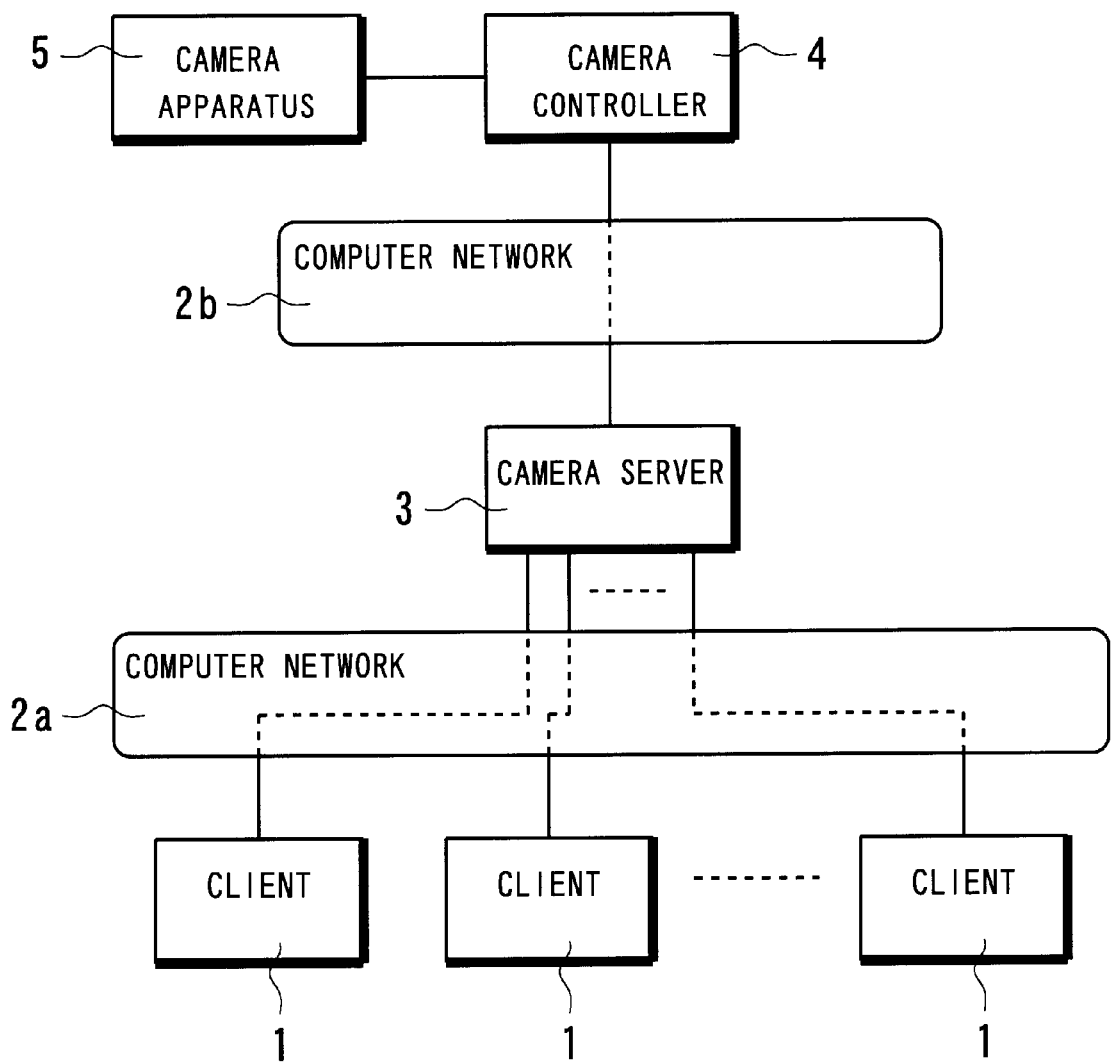
FIG. 1 is a block diagram showing the overall configuration of a remote-controlled camera-picture broadcast system according to a first embodiment of the present invention.

Preferred embodiments of the present invention will be described in detail below while referring to the drawings attached.

FIRST EMBODIMENT

As shown in FIG. 1, a remote-controlled camera-picture broadcast system according to a first embodiment of the present invention is comprised of clients 1, a camera server 3 connected to the clients 1 through a computer network 2a, a camera controller 4 connected to the camera server 3 through a computer network 2b, and a camera apparatus 5 connected directly to the camera controller 4.

Each of the clients 1 receives an input from a user and displays an output on its screen.

The camera apparatus 5, which is capable of various operations such as rotation and zooming under the control of the camera controller 4, acquires a moving picture and outputs a video signal of the picture to the camera controller 4.

The camera controller 4, which controls the camera apparatus 5, receives the video signal of the picture that has been acquired or shot in the camera apparatus 5, converts the video signal to a picture data, and transmits the picture data to the client 1 in question.

The camera server 3 mediates between the clients 1 and the camera controller 4. Specifically, the camera server 3 receives the operation demands transmitted from the clients 1 through the computer network 2a and then, transmits them to the camera controller 4 through the network 2b. Also, the camera server 3 receives the operation result of the camera apparatus from the camera controller 4.

The computer network 2a transmits the data or information between the clients 1 and the camera server 3.

The computer network 2b transmits the data or information between the camera server 3 and the camera controller 4.

Figure 2:
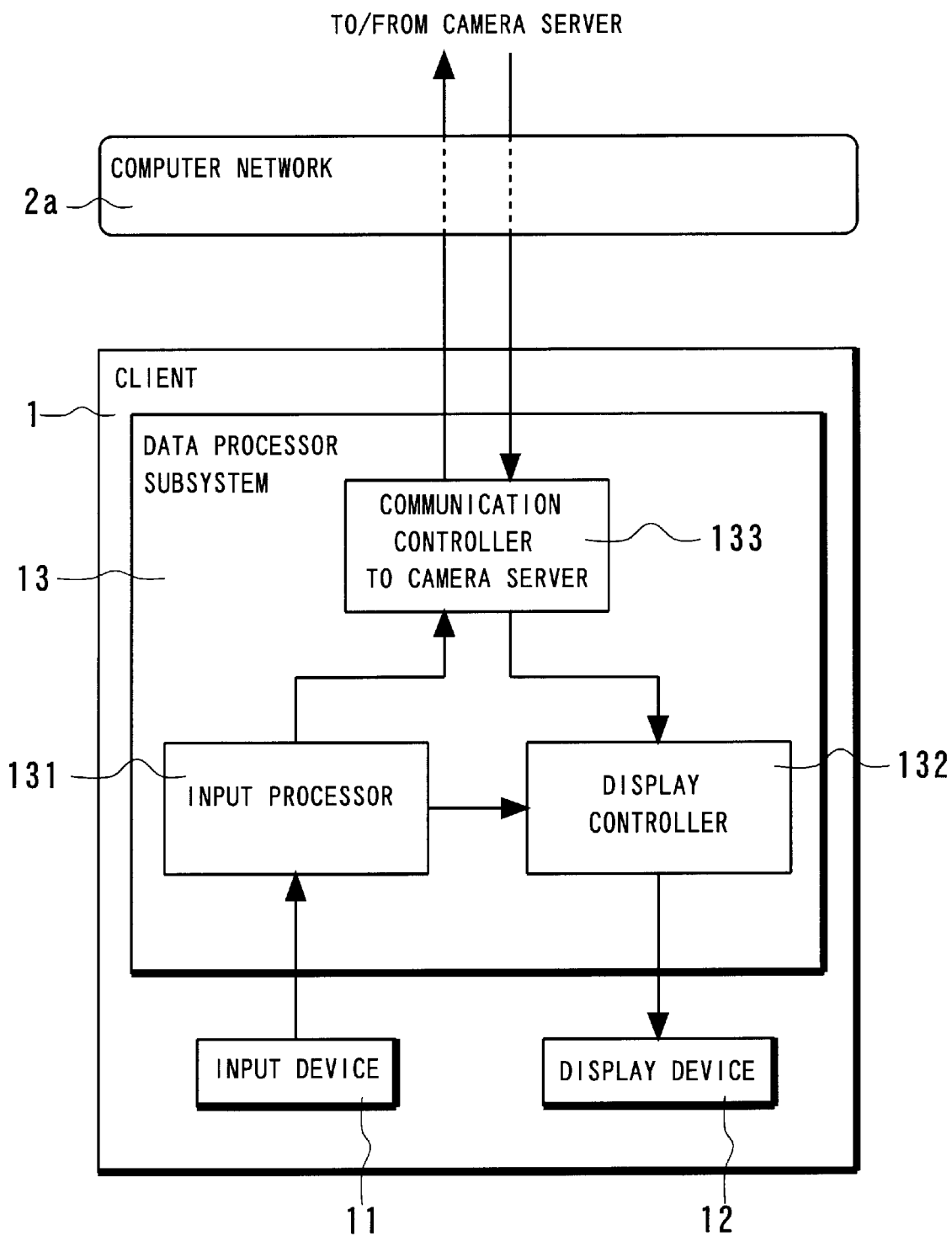
FIG. 2 is a block diagram showing the configuration of the client of the remote-controlled camera-picture broadcast system according to the first embodiment of FIG. 1.

Each of the clients 1 has the configuration as shown in FIG. 2.

In FIG. 2, the client 1 includes an input device 11 for accepting an input from a user, a display device 12 for displaying an output to a user, and a data processor subsystem 13 operated under the program control.

The data processor subsystem 13 has an input processor 131, a display controller 132, and a communication controller 133 to control the communication with the camera controller 4.

The input processor 131 of the data processor subsystem 3 of the client 1 analyzes the camera operation demand transmitted from the input device 11. Then, the input processor 131 transmits the analyzed camera operation demand and its feedback to the communication controller 133 and the display controller 132, respectively.

The display controller 132 controls the display device 12 to thereby display the feedback from the input processor 131 and the camera operation result and feedback transmitted from the communication controller 133 on the screen of the device 12.

The communication controller 133 transmits the camera operation demand from the input processor 131 to the camera server 3 through the computer network 2a. Also, the communication controller 133 transmits the camera operation result and its feedback given from the camera server 3 through the computer network 2a to the display controller 132.

Figure 3:
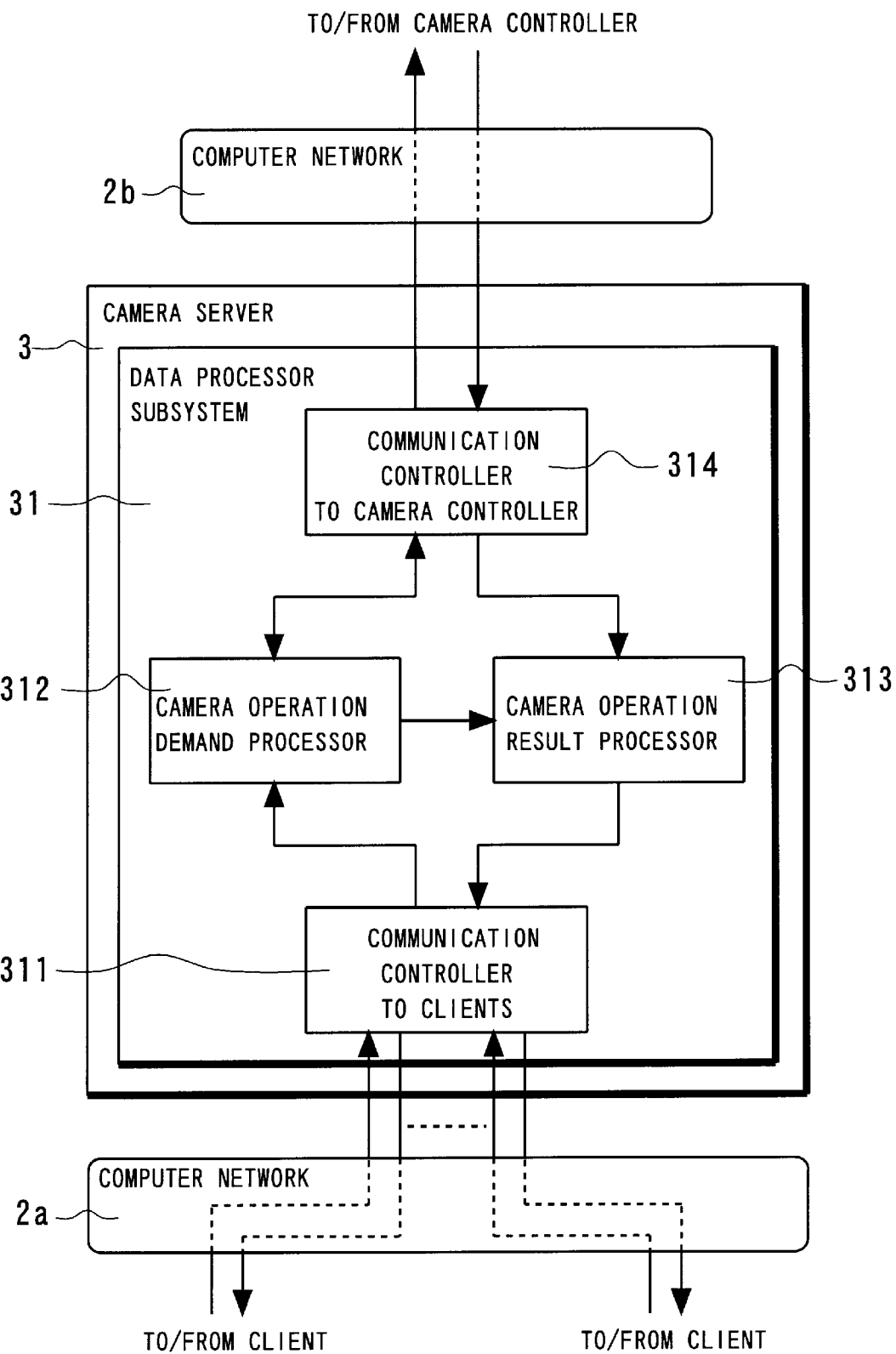
FIG. 3 is a block diagram showing the configuration of the camera server of the remote-controlled camera-picture broadcast system according to the first embodiment of FIG. 1.

The camera server 3 has the configuration as shown in FIG. 3, in which a data processor subsystem 31 operated under the program control is provided.

The data processor subsystem 31 is equipped with a communication controller 311 to the clients 1, a camera operation demand processor 312, a camera operation result processor 313, and a communication controller 314 to control the transmission with the camera controller 4.

The communication controller 311 transmits the camera operation demands which have been sent through the computer network 2a from the clients 1 to the camera operation demand processor 312. Also, the communication controller 311 transmits the camera operation result and its feedback which have been given from the camera operation result processor 313 to the clients 1 through the computer network 2a.

The camera operation demand processor 312 of the camera server 3 analyzes the camera operation demand given from the communication controller 311 and then, judges whether the camera control demand is able to be transmitted to the camera controller 4 on the basis of the operation state of the camera apparatus 5 given from the communication controller 314 or not. If the camera control demand is able to be transmitted to the camera controller 4, the camera operation demand processor 312 transmits a camera operation command corresponding to the analyzed camera operation demand and its feedback to the communication controller 314 and the camera operation result processor 313, respectively.

The camera operation result processor 313 transmits the analyzed camera operation result or its feedback given from the communication controller 314 and the feedback given from the camera operation demand processor 312 to the communication controller 311.

The communication controller 314 transmits the camera operation command given from the camera operation demand processor 312 to the camera controller 4 through the computer network 2b. Also, the communication controller 314 transmits the camera operation result and its feedback given front the camera controller 4 through the computer network 2b to the camera operation result processor 313. Further, the communication controller 314 transmits the information about the state of the camera apparatus 5 to the camera operation demand processor 312.

Figure 4:
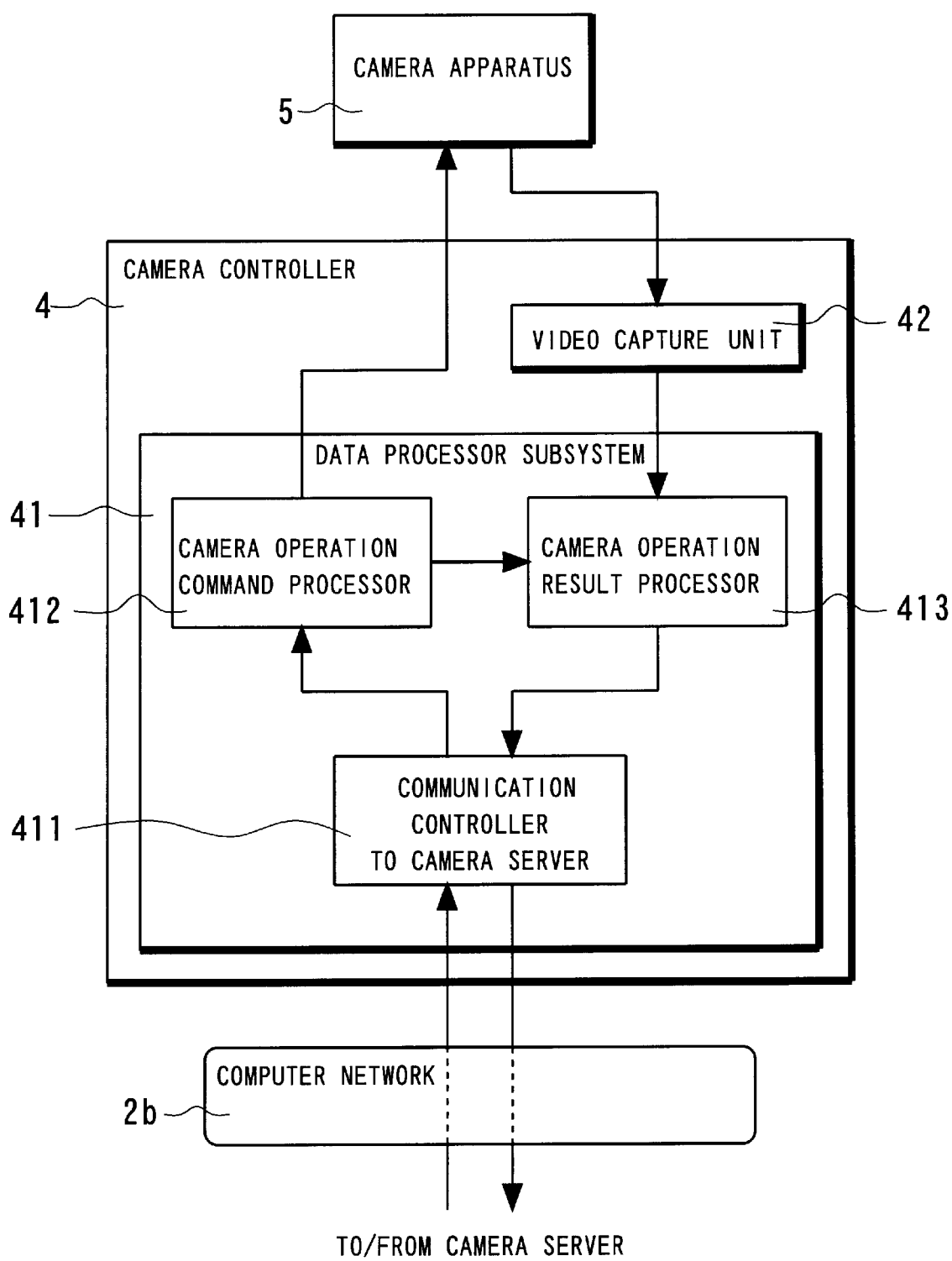
FIG. 4 is a block diagram showing the configuration of the camera controller and the camera apparatus of the remote-controlled camera-picture broadcast system according to the first embodiment of FIG. 1.

The camera controller 4 has the configuration as shown in FIG. 4, in which a data processor subsystem 41 operated under the program control and a video capture unit 42 for converting the video signal of the picture given from the camera apparatus 5 to the picture data are provided.

The data processor subsystem 41 is equipped with a communication controller 411 to control the transmission with the camera server 3, a camera operation command processor 412, and a camera operation result processor 413.

The communication controller 411 transmits the camera operation command which has been sent from the camera server 3 through the computer network 2b to the camera operation command processor 412. Also, the communication controller 411 transmits the camera operation result and its feedback which have been given from the camera operation result processor 413 to the camera server 3 through the computer network 2b.

The camera operation command processor 412 of the camera controller 4 transmits a control signal and its feedback to the camera controller 4 and the camera operation result processor 413 on the basis of the camera operation command given from the communication controller 411, respectively.

The camera operation result processor 413 transmits the feedback given from the camera operation result processor 412 and its feedback and the picture data given from the video capture unit 42 to the communication controller 411 as the operation result.

Next, the operation of the remote-controlled camera picture broadcast system according to the first embodiment is explained below with reference to FIGS. 5 to 7.

An input from a user (for example, an operation demand for orientation-change and/or zooming of the camera apparatus 5), which is usually applied by a mouse and/or a keyboard, is given to the input processor 131 of the data processor subsystem 13 through the input device 11 of one of the clients 1.

The input processor 131 of the client 1 interprets the input thus given and judges whether the input is normal or not in the step A101 and A102, respectively.

If the input is not normal, the input processor 131 transmits a feedback "ERROR" to the display controller 132 in the step A110. The display controller 132 controls the display device 12 to display the feedback "ERROR" on its screen, thereby notifying that the input is in error.

If the input is normal, the input processor 131 transmits a feedback "CONNECTING" to the display controller 132 in the step A103. The display controller 132 controls the display device 12 to display the feedback "CONNECTING" on its screen. Then, the input processor 131 transmits a camera operation demand corresponding to the input to the communication controller 133 to the camera server 3. In response to the camera operation demand thus transmitted, the communication controller 133 in the client 1 in question transmits or sends the camera operation demand thus received to the camera server 3 through the computer network 2a in the step A104.

Next, the communication controller 133 judges whether a feedback is transmitted from the camera server 3 through the computer network 2a or not in the step A105. If the feedback is transmitted from the camera server 3, the display controller 132 controls the display device 12 to display the feedback thus transmitted on its screen in the step A106. If the a feedback is not transmitted from the camera server 3, the flow is jumped to the step A110, thereby displaying the feedback "ERROR" on the screen of the display device 12.

Subsequently, when the feedback is transmitted from the camera server 3, the communication controller 133 judges whether the transmitted feedback is "OPERATING" or not in the step A107.

If the transmitted feedback is "OPERATING", the communication controller 133 judges whether an operation result or a feedback is transmitted from the camera server 3 or not in the step A 103. If the transmitted feedback is not "OPERATING", the flow is ended.

If the operation result or feedback is judged to be transmitted from the camera server 3 in the step A 108, the display controller 132 controls the display device 12 to display the operation result or feedback on its screen in the step A109.

Figure 6:
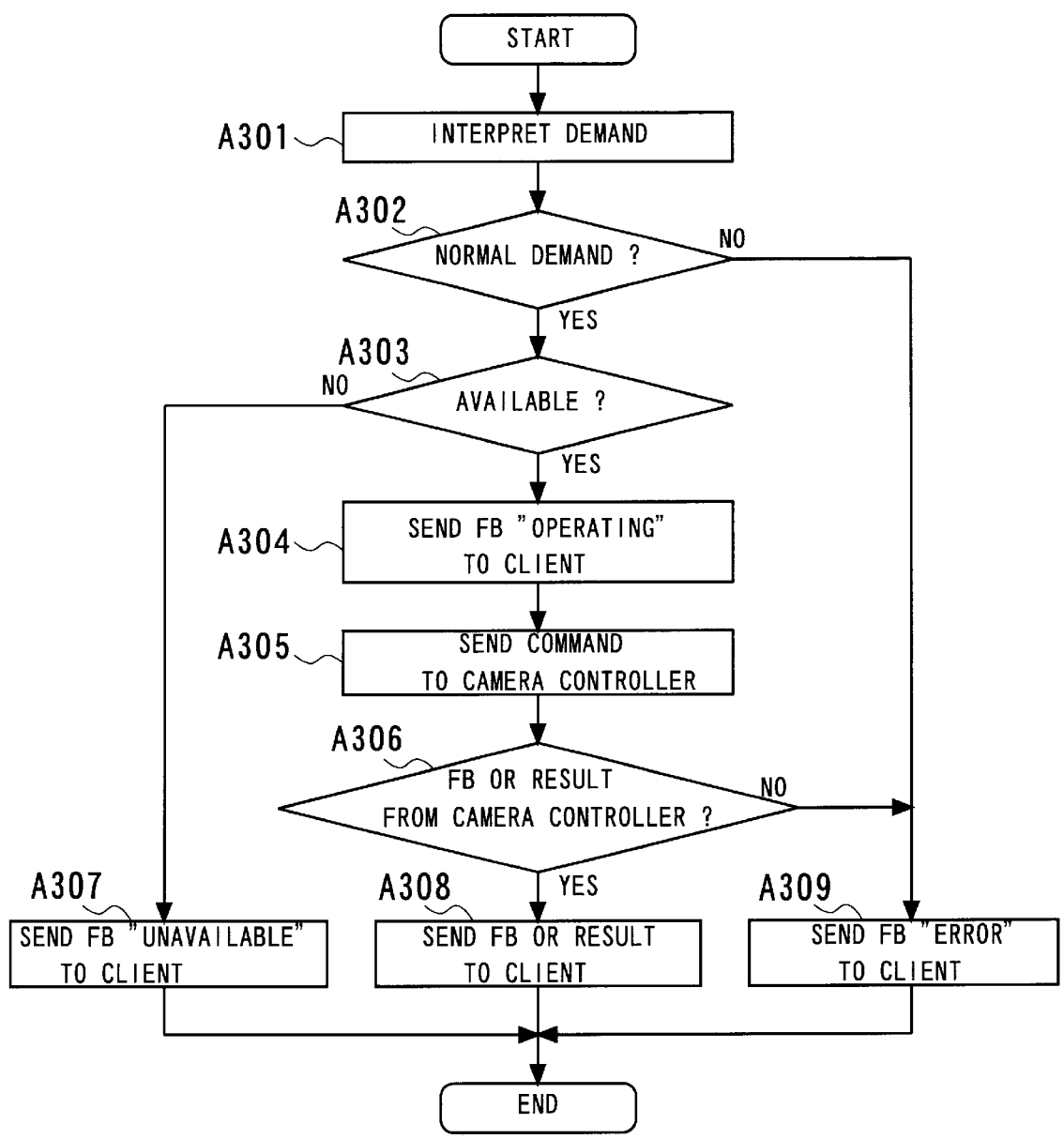
FIG. 6 is a flow chart showing the operation of the camera server of the remote-controlled camera-picture broadcast system according to the first embodiment of FIG. 1.

FIG. 6 shows the flowchart of the data processor subsystem 31 of the camera server 3.

As shown in FIG. 6, the camera operation demand processor 312 interprets the operation demand transmitted to the communication controller 311 through the computer network 2a in the step A301. Then, the camera operation demand processor 312 judges whether the operation demand thus transmitted is normal or not in the step A302.

If the operation demand is not normal, the camera operation demand processor 312 transmits a feedback "ERROR" to the camera operation result processor 313. Then, the camera operation result processor 313 transmits the feedback "ERROR" thus received to the communication controller 311, and further, the communication controller 311 transmits the feedback "ERROR" thus received to the client 1 in question through the network 2a. Thus, the display controller 132 controls the display device 12 to display the feedback "ERROR" on its screen in the step A309.

If the operation demand is normal, the camera operation demand processor 312 judges whether the camera apparatus 5 is available or not on the basis of the information about the state (for example, other user is operating the camera apparatus 5) of the camera apparatus 5 in the step A303.

If the camera apparatus 5 is not available, the camera operation demand processor 312 transmits a feedback "UNAVAILABLE" to the camera operation result processor 313. The feedback "UNAVAILABLE" thus transmitted is further sent to the display controller 132 of the client 1 in question, thereby displaying the feedback "UNAVAILABLE" on its screen by the display device 12 in the step A307.

If the camera apparatus 5 is available, the camera operation demand processor 312 transmits a feedback "OPERATING" to the camera operation result processor 313. The feedback "OPERATING" is further sent to the display controller 132 of the client 1 in question through the communication controller 311 and the network 2a, thereby displaying the feedback "OPERATING" on its screen in the step A304.

Then, the camera operation demand processor 312 transmits or sends the camera operation command corresponding to the received camera operation demand to the communication controller 314. In response to the camera operation command thus transmitted, the communication controller 314 transmits or sends the camera operation command thus received to the camera controller 4 through the computer network 2b in the step A305.

Subsequently, the communication controller 314 judges whether a camera operation result or a feedback is transmitted from the camera controller 4 or not through the computer network 2b in the step A306. If the camera operation result or feedback is transmitted from the camera controller 4, the camera operation result processor 313 transmits or sends the camera operation result or feedback thus received to the communication controller 311. In response to this, the communication controller 311 transmits the camera operation result or feedback to the client 1 from which the camera operation demand has been transmitted through the network 2a in the step A308.

If the camera operation result or feedback is not transmitted from the camera controller 4, the camera operation result processor 313 transmits or sends the feedback "ERROR" to the communication controller 311. In response to this, the communication controller 311 transmits the camera operation result or feedback to the client 1 from which the camera operation demand has been transmitted through the network 2a in the step A309.

Figure 7:
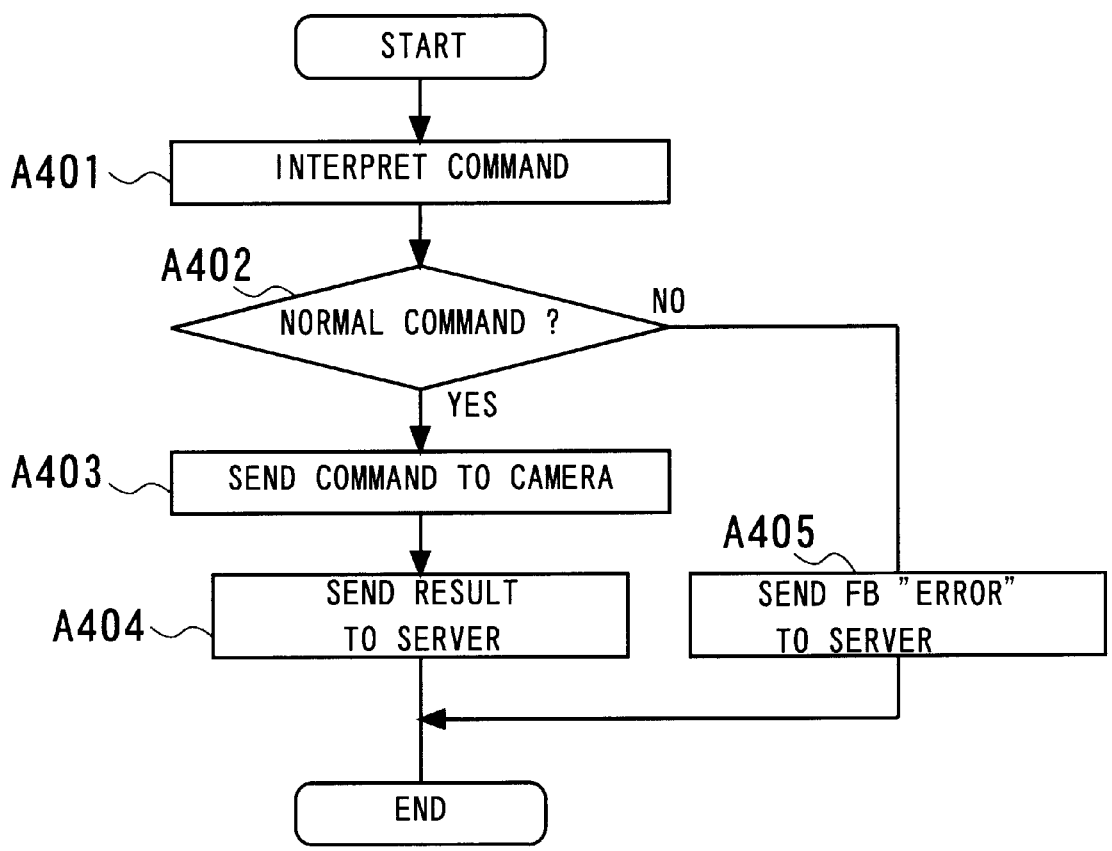
FIG. 7 is a flow chart showing the operation of the camera controller of the remote-controlled camera-picture broadcast system according to the first embodiment of FIG. 1.

FIG. 7 shows the flowchart of the data processor subsystem 41 of the camera controller 4.

As shown in FIG. 7, the camera operation command processor 412 interprets the camera operation command transmitted to the communication controller 411 through the computer network 2b in the step A401. Then, the camera operation command processor 412 judges whether the operation command thus transmitted is normal or not in the step A402.

If the operation command is not normal, the camera operation command processor 412 transmits a feedback "ERROR" to the camera operation result processor 413. In response to this, the camera operation result processor 413 sends the feedback "ERROR" to the camera server 3 through the network 2b in the step A405.

If the operation command is normal, the camera operation command processor 412 transmits a control signal to the camera apparatus 5 an the basis of the received camera operation command, thereby operating the camera apparatus 5 according to the camera operation demand from the user in the step A403.

The camera operation result processor 413 transmits the picture data to the communication controller 411 as the operation result, where the picture data is derived from conversion of the video signal at the time the camera operation has been finished by the video capture unit 42. The picture data as the camera operation result is transmitted by the communication controller 411 to the camera server 3 through the network 2b in the step A404.

With the remote-controlled camera-picture broadcast system according to the first embodiment of the present invention, the camera server 3 is connected to the clients 1 through the computer network 2a and to the camera controller 4 through the computer network 2b. This means that the camera controller 4 is not directly connected to the clients 1, which is unlike the previously-described conventional remote-controlled camera-picture broadcast system.

Also, the operation demands transmitted from the clients 1 are received by the camera server 3 provided between the clients 1 and the camera controller 4, and thereafter, the operation commands corresponding to the operation demands thus received are transmitted to the camera controller 4 by the camera server 3 as necessary. Thus, there is no possibility that an infinitely increasing load is applied to the camera controller 4 and the computer network 2b connected thereto even when the use of a lot of unspecified users is concentrated on this system.

Moreover, since the inquiry about the state of the camera apparatus 5 occurs synchronized with the operation demands transmitted from the clients 1, there is no need to always or continuously interconnect the camera controller 4 with the camera server 3 through the computer network 2b.

As a result, the camera controller 4 and the computer network 2b connected thereto need not have high performance, which decreases the cost of hardware and network for the use of a lot of unspecified users.

Because the camera controller 4 is not directly utilized by the clients 1, the camera controller 4 does not tend to operate unstably due to load change and/or unjust access even if the broadcast system is used by a lot of unspecified users.

Thus, the necessity of maintenance of the camera controller 4, which is usually located at a distant place, is decreased.

Further, the access authority is acquired to be synchronized with the transmission of the operation demands transmitted from the clients 1. Also, the holding time of the access authority is able to be limited within a short period when the camera apparatus 5 is actually operated by the operation commands.

Accordingly, the overhead is lowered even on use by a lot of unspecified users.

Figure 13:
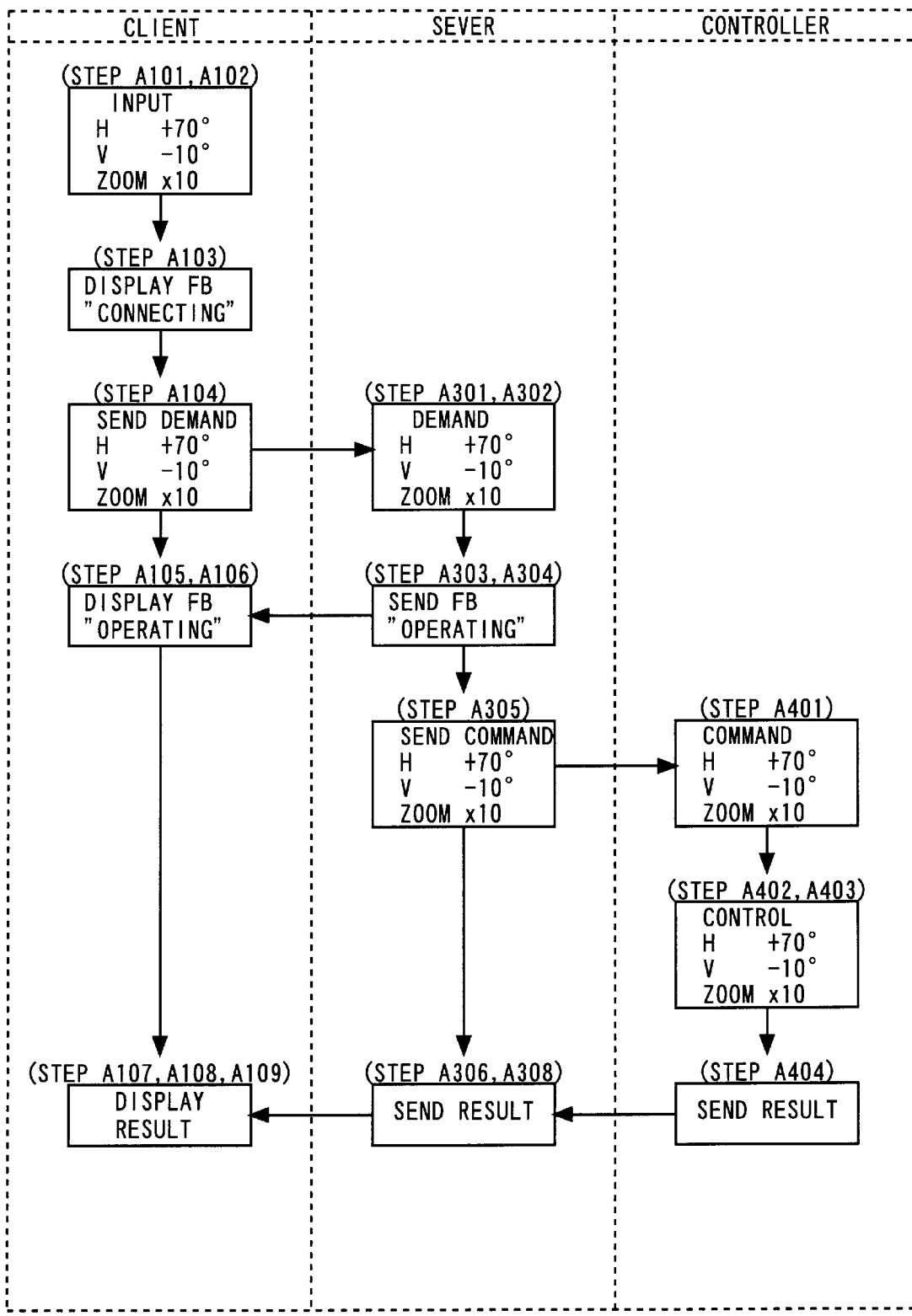
FIG. 13 is a schematic view showing the concrete operation of the remote-controlled camera-picture broadcast system according to the first embodiment of FIG. 1.

FIG. 13 schematically shows the concrete operation of the remote-controlled camera-picture broadcast system according to the first embodiment of the present invention.

In FIG. 13, it is supposed that the camera apparatus 5 is capable of rotation and zooming operations, and the camera apparatus 5 is in the available state.

It is assumed that a camera operation demand or a user input of "horizontal rotation of +70°, vertical rotation of −10°, and zooming of 10 times" is given to the input device 11 of one of the clients 1 of this system, where the content of this operation command is included within the permissible range of this camera apparatus 5.

The input processor 131 of the client 1 interprets the input of "horizontal rotation of +70°, vertical rotation of −10°, and zooming of 10 times" and judges it as a normal input (steps A101 and A102) . In this case, the input processor 131 transmits a feedback "CONNECTING" to the display controller 132, thereby displaying the feedback "CONNECTING" on its screen (step A103).

Then, the input processor 131 of the client 1 transmits the input or camera operation demand of "horizontal rotation of +70°, vertical rotation of −10°, and zooming of 10 times" to the communication controller 133. In response to this, the communication controller 133 of the client 1 transmits or sends the camera operation demand to the communication controller 311 of the camera server 3 through the computer network 2a (step A104).

The camera operation demand "horizontal rotation of +70°, vertical rotation of −10°, and zooming of 10 times" thus transmitted to the communication controller 311 is then interpreted by the camera operation demand processor 312 of the camera server 3, and the demand is judged as normal (steps A301 and A302). Since the demand is judged as normal and the camera apparatus 5 is supposed to be available, the camera operation demand processor 312 of the camera server 3 judges that the camera apparatus 5 is available.

Subsequently, the camera operation demand processor 312 of the camera server 3 transmits or sends the feedback "OPERATING" to the camera operation result processor 313. In response to this, the camera operation result processor 313 transmits or sends the feedback "OPERATING" to the client 1 in question through the computer network 2a (steps A303 and A304).

The feedback "OPERATING", which has been transmitted from the camera server 3 to the communication controller 133 of the client 1 through the network 2a, is displayed on the screen of the display device 12 by the display controller 132 (steps A105 and A106).

The camera operation demand processor 312 of the camera server 3, which has transmitted the feedback "OPERATING", transmits a camera operation command to the communication controller 314 of the camera server 3 on the basis of the camera operation demand "horizontal rotation of +70°, vertical rotation of −10°, and zooming of 10 times". In response to this, the communication controller 314 of the server 3 transmits or sends the camera operation command to the camera controller 4 through the network 2b (step A305).

The operation command of "horizontal rotation of +70°, vertical rotation of −10°, and zooming of 10 times" thus transmitted to the communication controller 411 of the camera controller 4 is interpreted by the camera operation command processor 412 thereof, and then, this command is judged as normal (steps A 401 and A402). Thus, a control signal corresponding to the transmitted command, i.e., "horizontal rotation of +70°, vertical rotation of −10°, and zooming of 10 times", is transmitted to the camera apparatus 5 by the camera operation command processor 412 of the camera controller 4, thereby operating the camera apparatus 5 according to the control signal (step A 403).

When the camera operation of "horizontal rotation of +70°, vertical rotation of −10°, and zooming of 10 times" has been completed, the present picture data, which is produced by the video capture unit 42, is transmitted to the communication controller 411 of the camera controller 4 as the operation result. The picture data is obtained by converting the video signal acquired by the camera apparatus 5 using the video capture unit 42. In response to this, the communication controller 411 of the camera controller 4 transmits or sends the operation result (i.e., the picture data) to the camera server 3 through the network 2b (step A404).

Then, the operation result (i.e., the picture data) which has been transmitted to the communication controller 314 of the camera server 3 through the network 2b, is sent to the communication controller 311 of the server 3 by the camera operation result processor 313. In response to this, the communication controller 311 sends the operation result (i.e., the picture data) to the client 1 in question from which the camera operation demand has been sent through the computer network 2a (steps A306 and A308).

The operation result (i.e., the picture data), which has been sent to the communication controller 133 of the client 1 in question, is displayed on the screen of the display device 12 by the display controller 132 (steps A107, A108, and 109).

Thus, the picture data corresponding to the camera operation demand of "horizontal rotation of +70°, vertical rotation of −10°, and zooming of 10 times", which has been inputted by the input device 11, is displayed on the screen of the display device 12 of the client 1 in question.

SECOND EMBODIMENT

Figure 8:
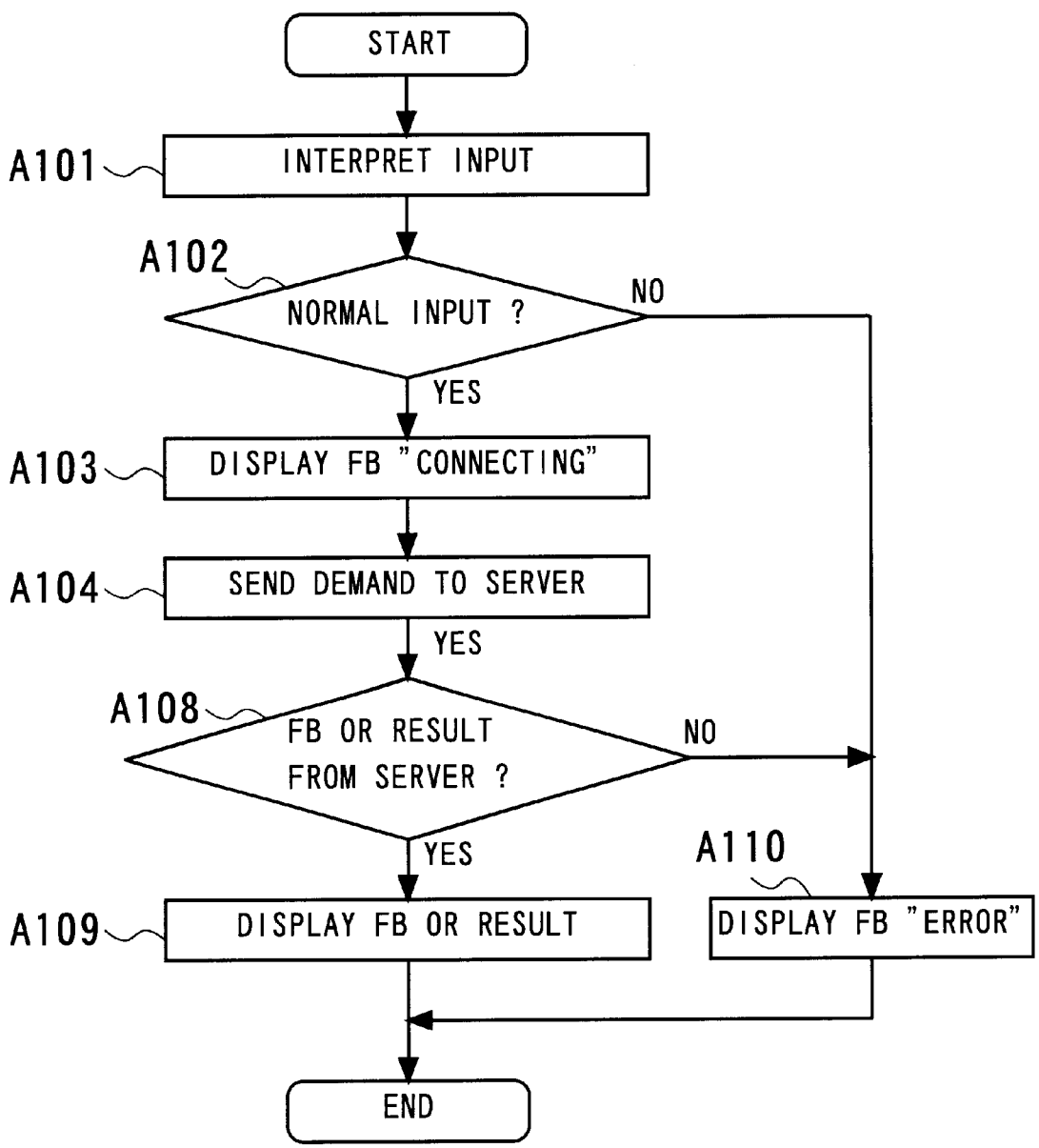
FIG. 8 is a flow chart showing the operation of the client of the remote-controlled camera-picture broadcast system according to a second embodiment of the present invention.
Figure 9:
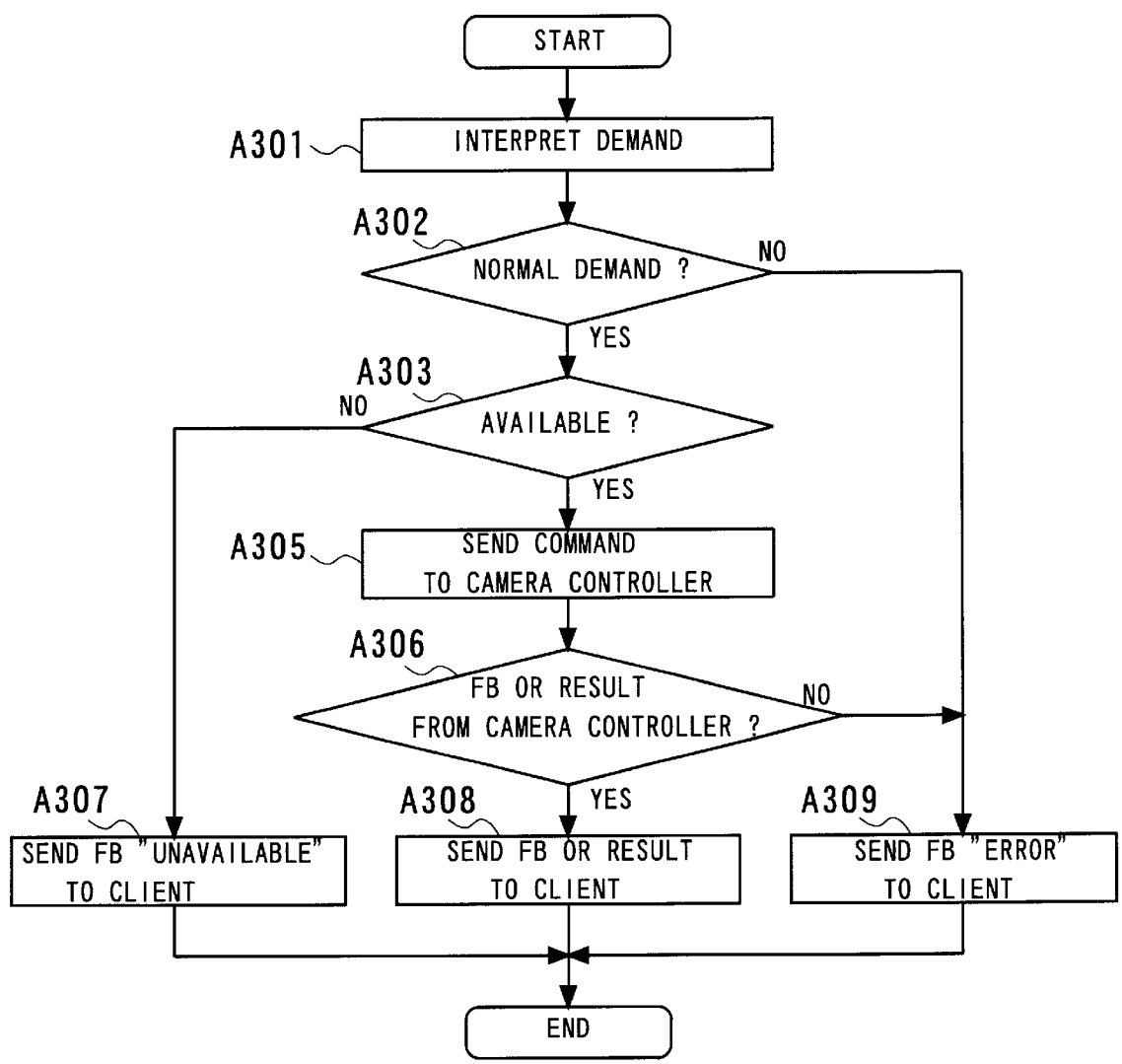
FIG. 9 is a flow chart showing the operation of the camera server of the remote-controlled camera-picture broadcast system according to the second embodiment of FIG. 8.

FIGS. 8 and 9 show the operation of the clients 1 and the camera server 3 of a remote-controlled camera-picture broadcast system according to a second embodiment of the present invention, respectively.

The system according to the second embodiment has the same configuration as that of the first embodiment except that the operation of the clients 1 and the camera server 3 are different. Therefore, the structural explanation of the system is omitted here for the sake of simplification.

Figure 5:
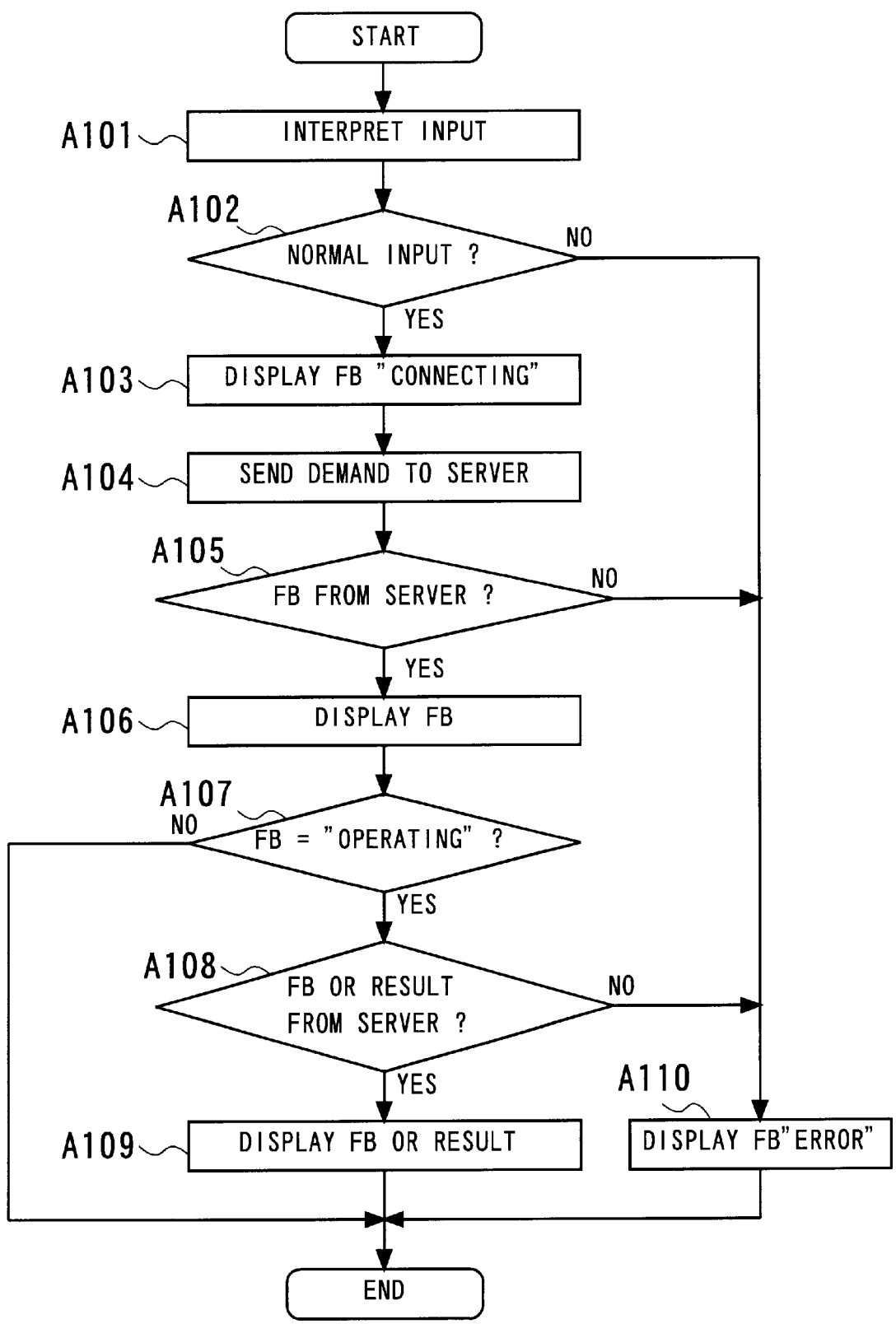
FIG. 5 is a flow chart showing the operation of the client of the remote-controlled camera-picture broadcast system according to the first embodiment of FIG. 1.

As shown in FIG. 8, the operation of the clients 1 is the same as the first embodiment except that the steps A 105 to A107 in the flowchart of the first embodiment of FIG. 5 are omitted.

As shown in FIG. 9, the operation of the camera server 3 is the same as the first embodiment except that the step A304 in the flowchart or the first embodiment of FIG. 6 is omitted.

Figure 14:
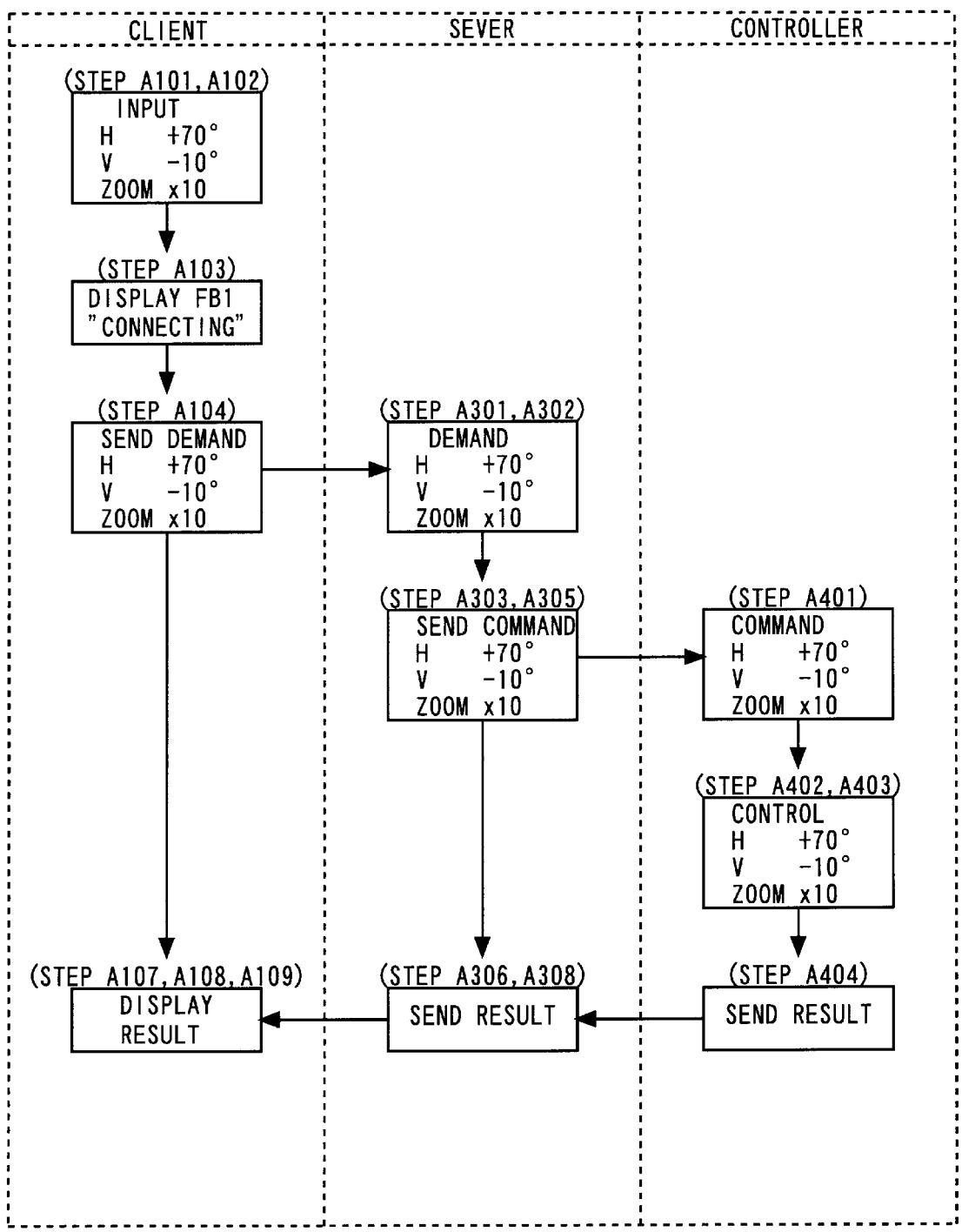
FIG. 14 is a schematic view showing the concrete operation of the remote-controlled camera-picture broadcast system according to the second embodiment of FIG. 8.

FIG. 14 schematically shows the concrete operation of the remote-controlled camera-picture broadcast system according to the second embodiment of the present invention.

This concrete operation is substantially the same as that of the first embodiment except that the step of transmission of the feedback "OPERATING" from the camera server 3 to the client 1 and the step of processing of the feedback "OPERATING" is omitted.

With the remote-controlled camera-picture broadcast system according to the second embodiment of the present invention, there is an additional advantage that the load to the clients 1 and the computer network 2b can be decreased when the performance of at least one of each client 1 and the computer network 2b is not high, in addition to the same advantages as those of the first embodiment.

THIRD EMBODIMENT

FIGS. 10A and 10B, 11A and 11B, and 12 show the operation of the clients 1, the camera server 3, and the camera controller 4 of a remote-controlled camera-picture broadcast system according to a third embodiment of the present invention, respectively.

The system according to the third embodiment has the same configuration as that of the first embodiment except that the operation of the clients 1, the camera server 3, and the camera controller 4 are different. Therefore, the structural explanation of the system is omitted here for the sake of simplification.

The operation of the client 1 is substantially the same as that of the first embodiment except for the following difference.

Figure 10A:
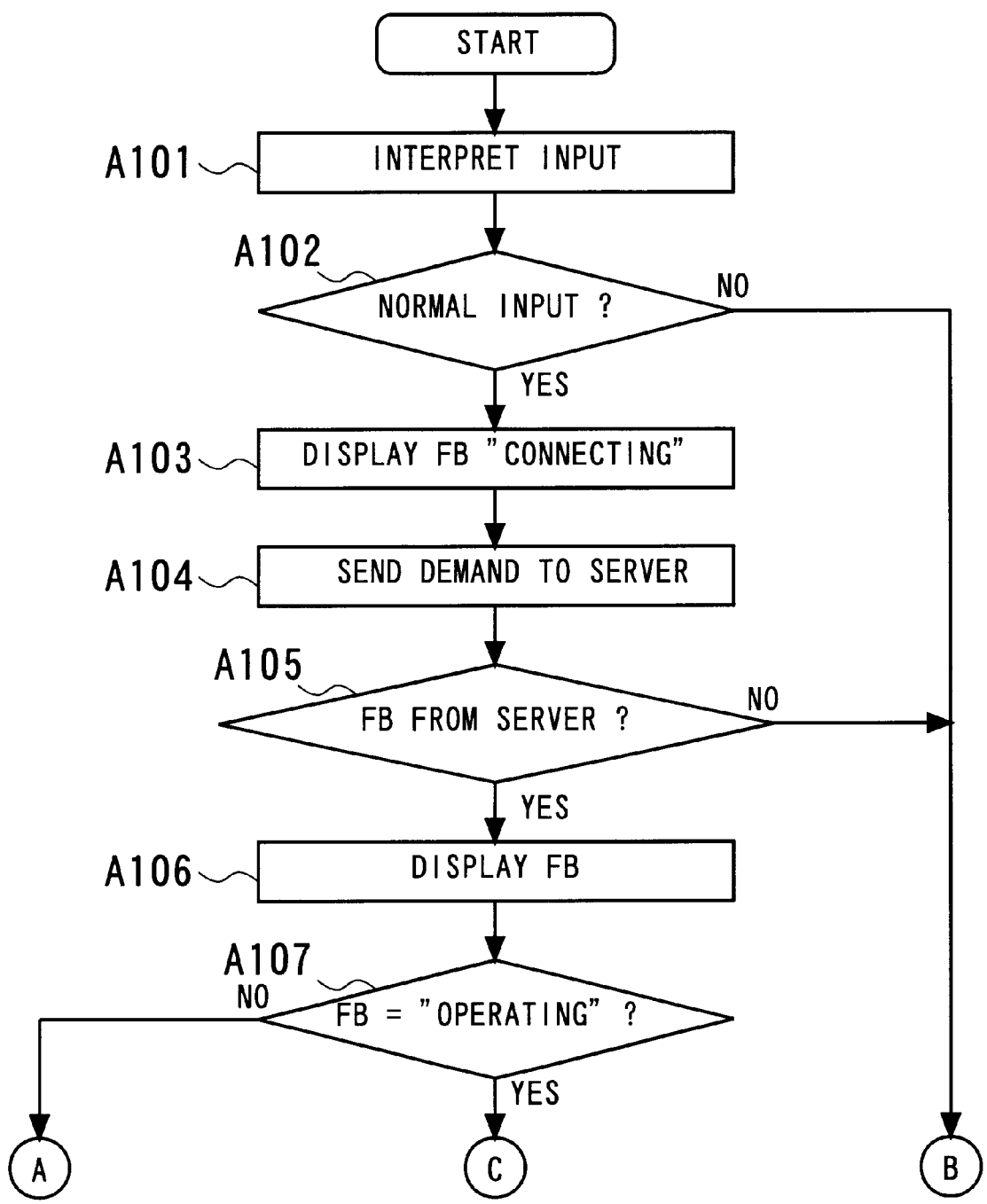
FIGS. 10A and 10B are a flow chart showing the operation of the client of the remote-controlled camera-picture broadcast system according to a third embodiment of the present invention.
Figure 10B:
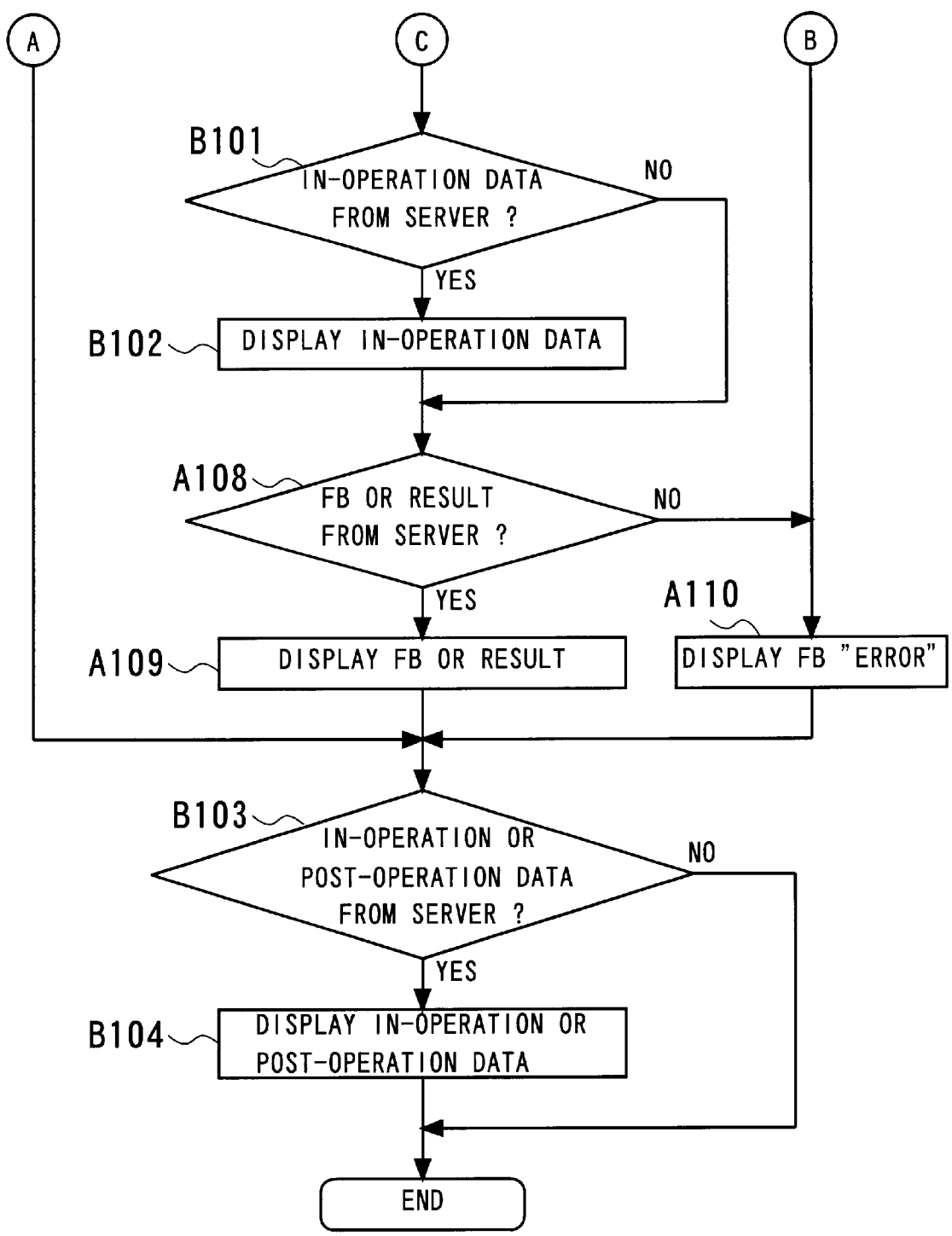

As shown in FIGS. 10A and 10B, prior to the judgment whether the feedback is transmitted from the camera server 3 or not in the step A108, the communication controller 133 of the client 1 judges whether the in-operation data is transmitted from the camera server 3 or not in the step B101. Here, the in-operation data means the picture data during the desired operation of the camera apparatus 5.

If the in-operation data is transmitted from the camera server 3, the display controller 132 controls the display device 12 to display the in-operation data on its screen in the step B102. Following this, the step A108 is carried out.

If the in-operation data is not transmitted from the camera server 3, the flow is jumped from the step B101 to the step A108 without the step B102.

After the step A 109 or A110 is carried out, the communication controller 133 of the client 1 judges whether the in-operation or post-operation data is transmitted from the camera server 3 or not in the step B103. If the in-operation data or post-operation is transmitted from the camera server 3, the display controller 132 controls the display device 12 to display the in-operation or post-operation data on its screen in the step B104. If none of the in-operation and post-operation data are transmitted from the camera server 3, the flow is jumped from the step B103 to END without the step B104.

The operation of the camera server 3 of the system according to the third embodiment is substantially the sane as that of the first embodiment except for the following difference.

Figure 11A:
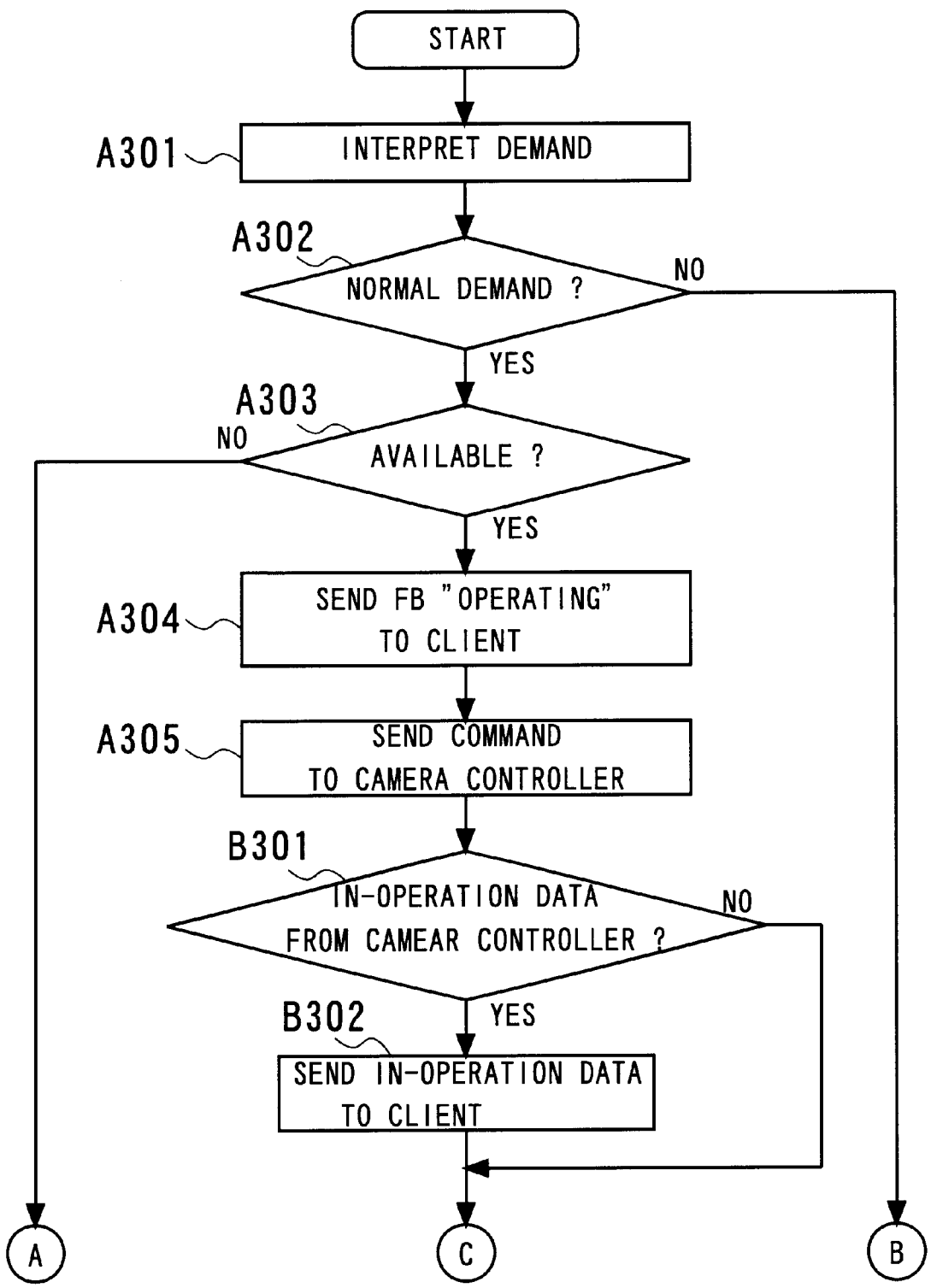
FIGS. 11A and 11B are a flow chart showing the operation of the camera server of the remote-controlled camera-picture broadcast system according to the third embodiment of FIGS. 10A, 10B, and 12.
Figure 11B:
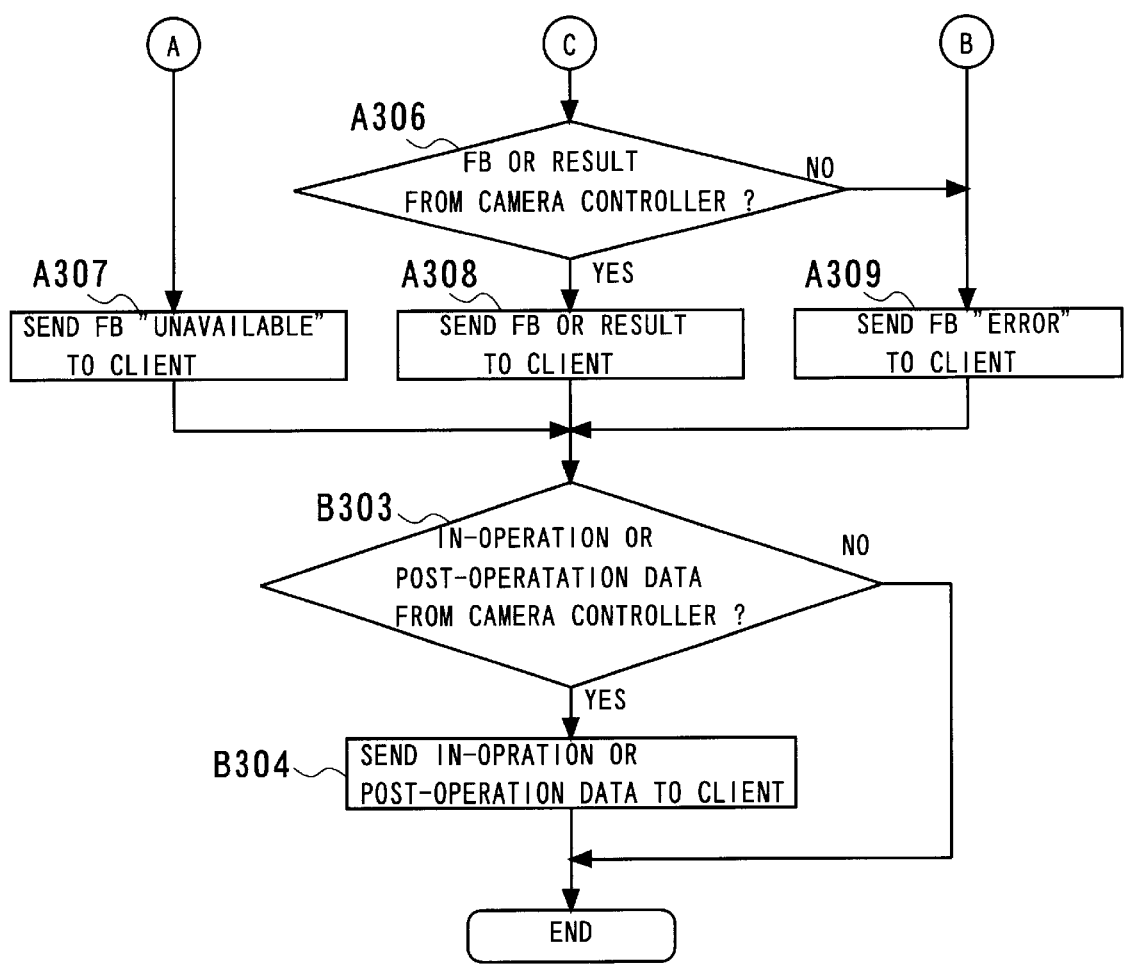

As shown in FIGS. 11A and 11B, prior to the judgment whether the feedback or camera operation result is transmitted from the camera controller 4 or not in the step A306, the communication controller 314 judges whether the in-operation data is transmitted from the camera controller 4 or not in the step B301. If the in-operation data is transmitted from the camera controller 4, the communication controller 314 transmits the in-operation data to the client 1 in question in the step B302. If the in-operation data is not transmitted from the camera controller 4, the flow is jumped from the step B301 to A306 without the step B302.

After the step A 307, A308, or A309, the communication controller 314 judges whether the in-operation or post-operation data is transmitted from the camera controller 4 or not in the step B303. Here, the post-operation data means the picture data acquired after the desired operation of the camera apparatus 5 has been completed.

If the in-operation data or post-operation is transmitted from the camera controller 4, the display controller 132 controls the display device 12 to display the in-operation or post-operation data on its screen in the step B304. If none of the in-operation and post-operation data are not transmitted from the camera controller 4, the flow is jumped from the step B303 to END without the step B304.

The operation of the camera controller 4 is substantially the same as that of the first embodiment except for the following difference.

As shown in FIG. 12, after the step A403 in which the camera operation command processor 412 sends a control signal to the camera apparatus 5 to thereby operate the camera apparatus 5, the camera operation result processor 413 transmits or sends the in-operation picture data to the communication controller 411 in the step B401, where the in-operation picture data is derived from conversion of the video signal at the time the camera apparatus 5 is in operation by the video capture unit 42. Then, the flow is jumped to the step A404.

After the step A404 in which the camera operation result is sent to the camera server 3 or the step A405 in which the feedback "ERROR" is sent to the camera server 3, the camera operation result processor 413 transmits or sends the post-operation picture data to the camera server 3 in the step B402, where the post-operation picture data is derived from conversion of the video signal at the time the camera apparatus 5 has been finished by the video capture unit 42.

Figure 15:
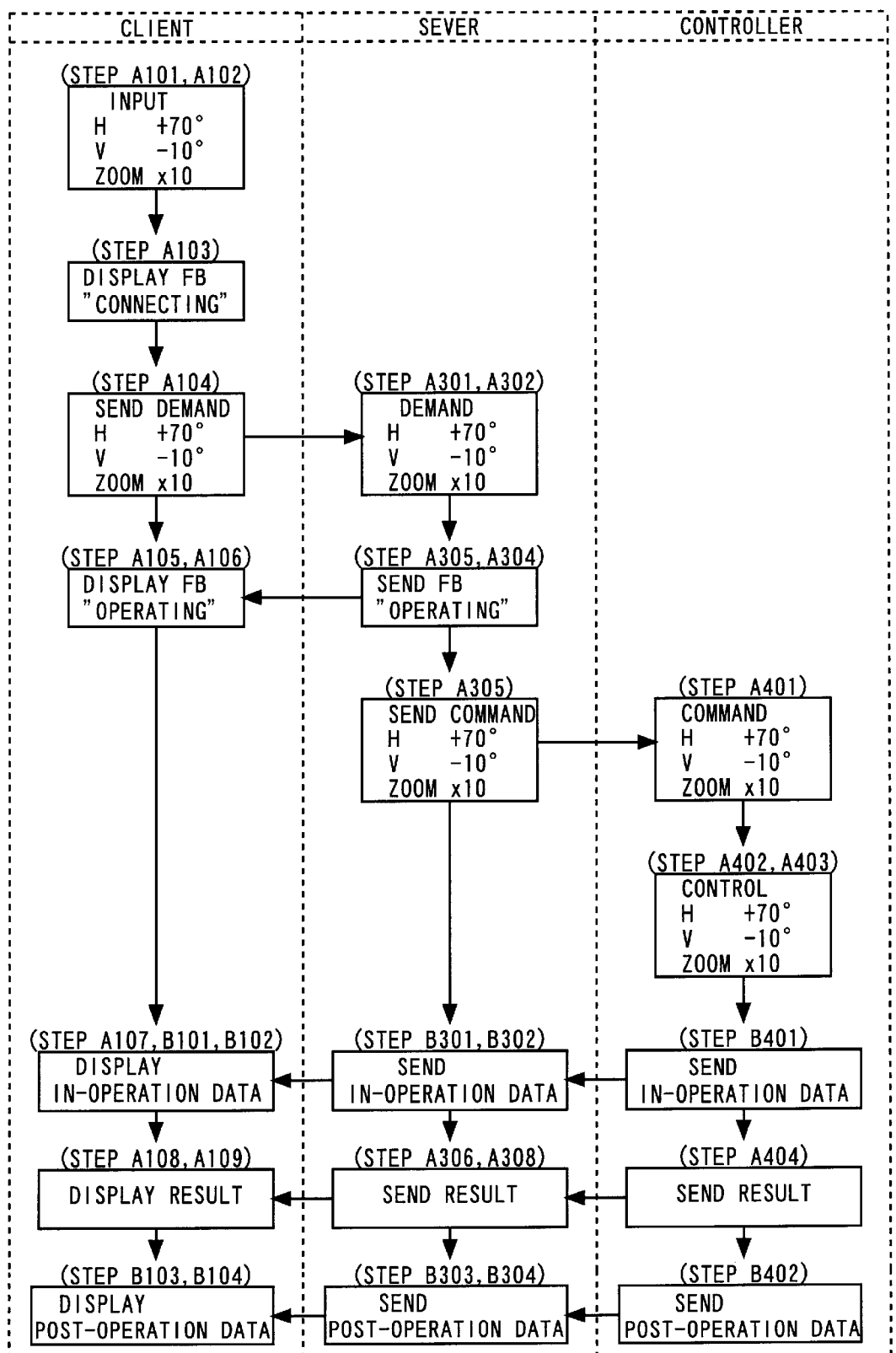
FIG. 15 is a schematic view showing the concrete operation of the remote-controlled camera-picture broadcast system according to the third embodiment of FIGS. 10A, 10B, and 12.

FIG. 15 schematically shows the concrete operation of the remote-controlled camera-picture broadcast system according to the third embodiment of the present invention.

This concrete operation is substantially the same as that of the first embodiment except for the following difference.

As seen from FIGS. 13 and 15, the steps before the steps A 401 to A403 are the same as those in the first embodiment.

In the steps A 401 and A402, the operation command of "horizontal rotation of +70°, vertical rotation of −10°, and zooming of 10 times" transmitted to the communication controller 411 of the camera controller 4 is interpreted by the camera operation command processor 412 thereof, and then, this command is judged as normal. Thus, a control signal corresponding to the transmitted command, i.e., "horizontal rotation of +70°, vertical rotation of −10°, and zooming of 10 times", is transmitted to the camera apparatus 5 by the camera operation command processor 412 of the camera controller 4, thereby operating the camera apparatus 5 according to the control signal in the step A 403.

Subsequently, the in-operation picture data is sent to the camera server 3 in the same way as the case of the operation result (step B401). Then, the in-operation picture data is sent to the client 1 from which the camera operation demand has been sent (steps B301 and B302). The in-operation picture data is displayed on the screen of the display device 12 by the display controller 132 (steps A107, A108, and A109).

The post-operation picture data, which is derived from conversion of the video signal after the camera operation is completed by the video capture unit 4, is transmitted to the camera server 3 in the same way as the post-operation result (step B402). Then, the post-operation picture data is sent to the client 1 from which the camera operation demand has been sent (steps B303 and B304). The post-operation picture data is displayed on the screen of the display device 12 by the display controller 132 (steps B103 and B104).

With the remote-controlled camera-picture broadcast system according to the third embodiment of the present invention, there is an additional advantage that not only the operation result but also the post-operation and in-operation picture data can be transmitted to the clients 1, in addition to the same advantages as those of the first embodiment.

FOURTH EMBODIMENT

Figure 16:
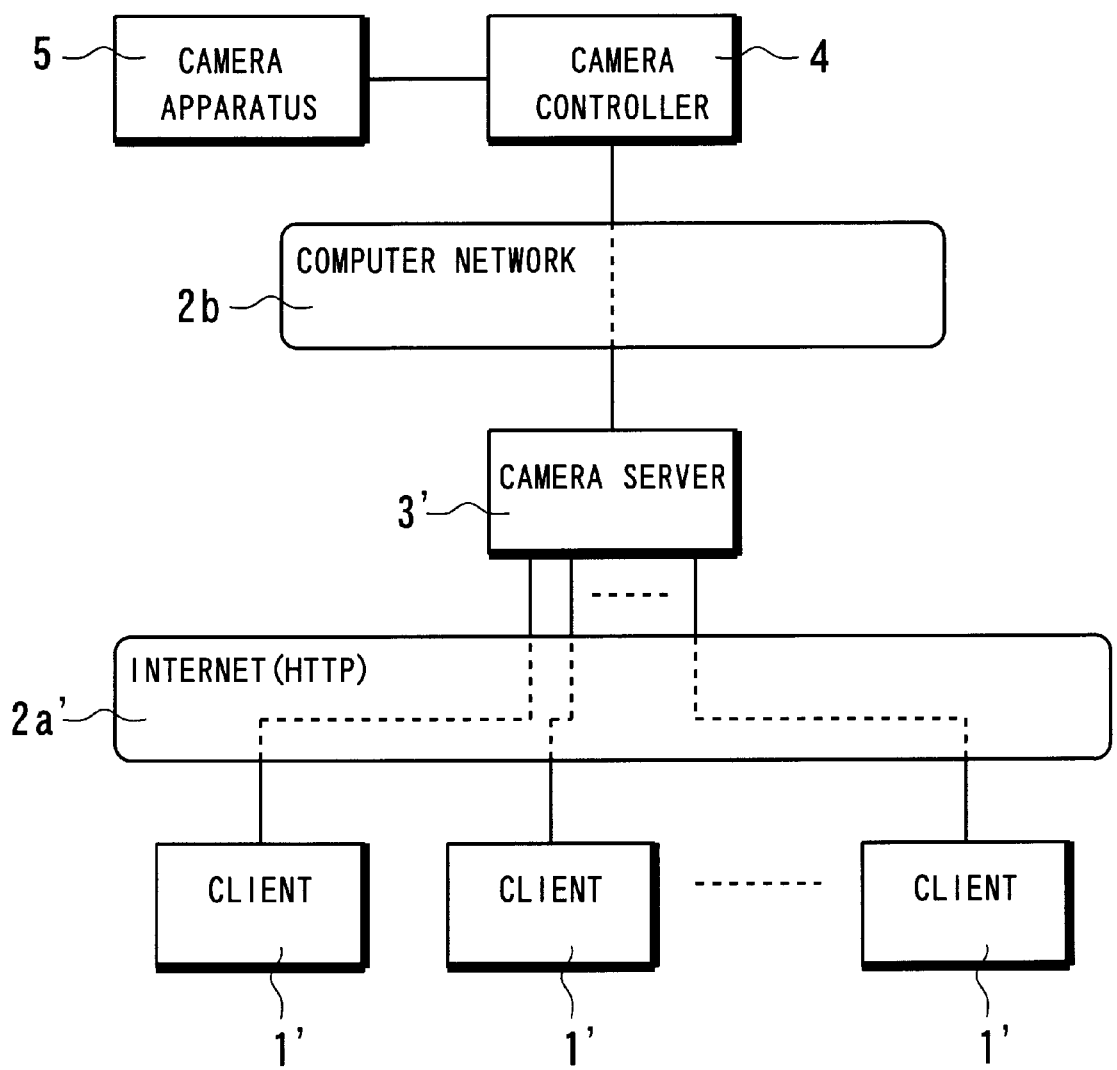
FIG. 16 is a block diagram showing the overall configuration of a remote-controlled camera-picture broadcast system according to a fourth embodiment of the present invention.
Figure 17:
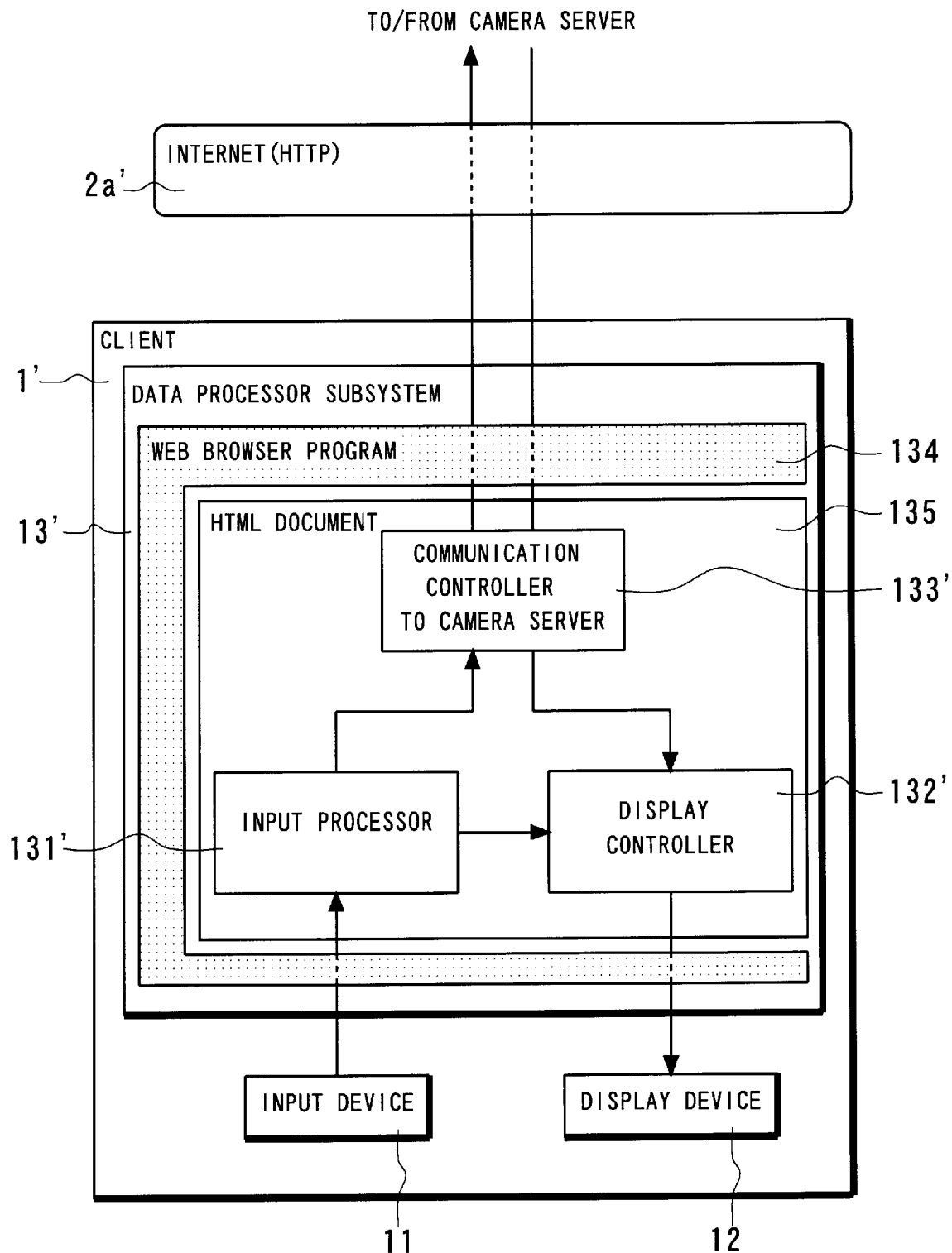
FIG. 17 is a block diagram showing the configuration of the client of the remote-controlled camera-picture broadcast system according to the fourth embodiment of FIG. 16.
Figure 18:
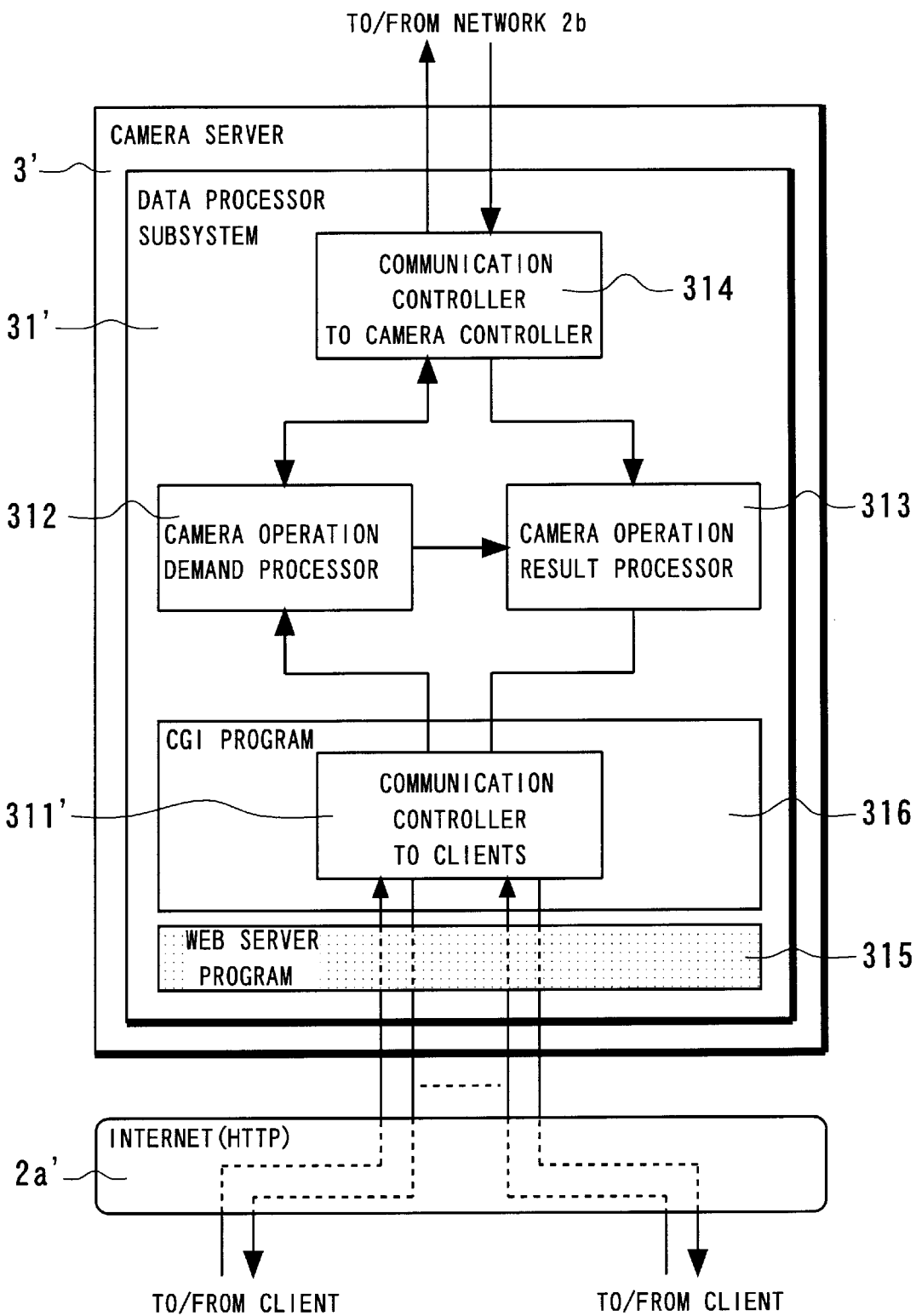
FIG. 18 is a block diagram showing the configuration of the camera server of the remote-controlled camera-picture broadcast system according to the fourth embodiment of FIG. 16.

FIGS. 16 to 18 show a remote-controlled camera-picture broadcast system according to a fourth embodiment of the present invention.

As seen from FIG. 16, the system according to the fourth embodiment has the same configuration as the first embodiment except that each of clients 1' is connected to a camera server 3' through the Internet 2a' in which the Hyper-Text Transfer Protocol (HTTP) is usually used for data transmission.

Each of the clients 1' has the configuration shown in FIG. 17, and the camera server 3' has the configuration shown in FIG. 18.

As shown in FIG. 17, unlike the first embodiment, a data processor subsystem 13' has a web browser program 134 and a document 135 written by the Hyper-Text Markup Language (HTML) about the operation of the camera apparatus 5. An input processor 131', a display controller 132', and a communication processor 133' are included in the RTML document 135. The information or data transmission between the input processor 131' and the display device 12, between the display controller 132' and the display device 12, and between the communication processor 133' and the camera server 3' is carried out through the web browser program 134.

As shown in FIG. 18, unlike the first embodiment, a data processor subsystem 31' of the camera server 3' has a web server program 315 and a Common Gateway Interface (CGI) program 316 for the purpose of operating the camera apparatus 5. A communication controller 311' is included in the CGI program 316.

With the remote-controlled camera-picture system according to the fourth embodiment of the present invention, because of the above-described configuration, if each of the clients 11 is simply equipped with the web browser program 134 capable of connection to the web server program 315 in the camera server 3, the camera apparatus 5 is able to be operated by the client 1' without any dedicated program nor any dedicated computer network for remote-controlling the camera apparatus 5 from the clients 1'.

As a result, this system facilitates the access of a lot of unspecified users.

It is needless to say that the Internet 2' may be replaced with a local area network (LAN) in order to restrict the users within a narrow range.

FIFTH EMBODIMENT

Figure 19:
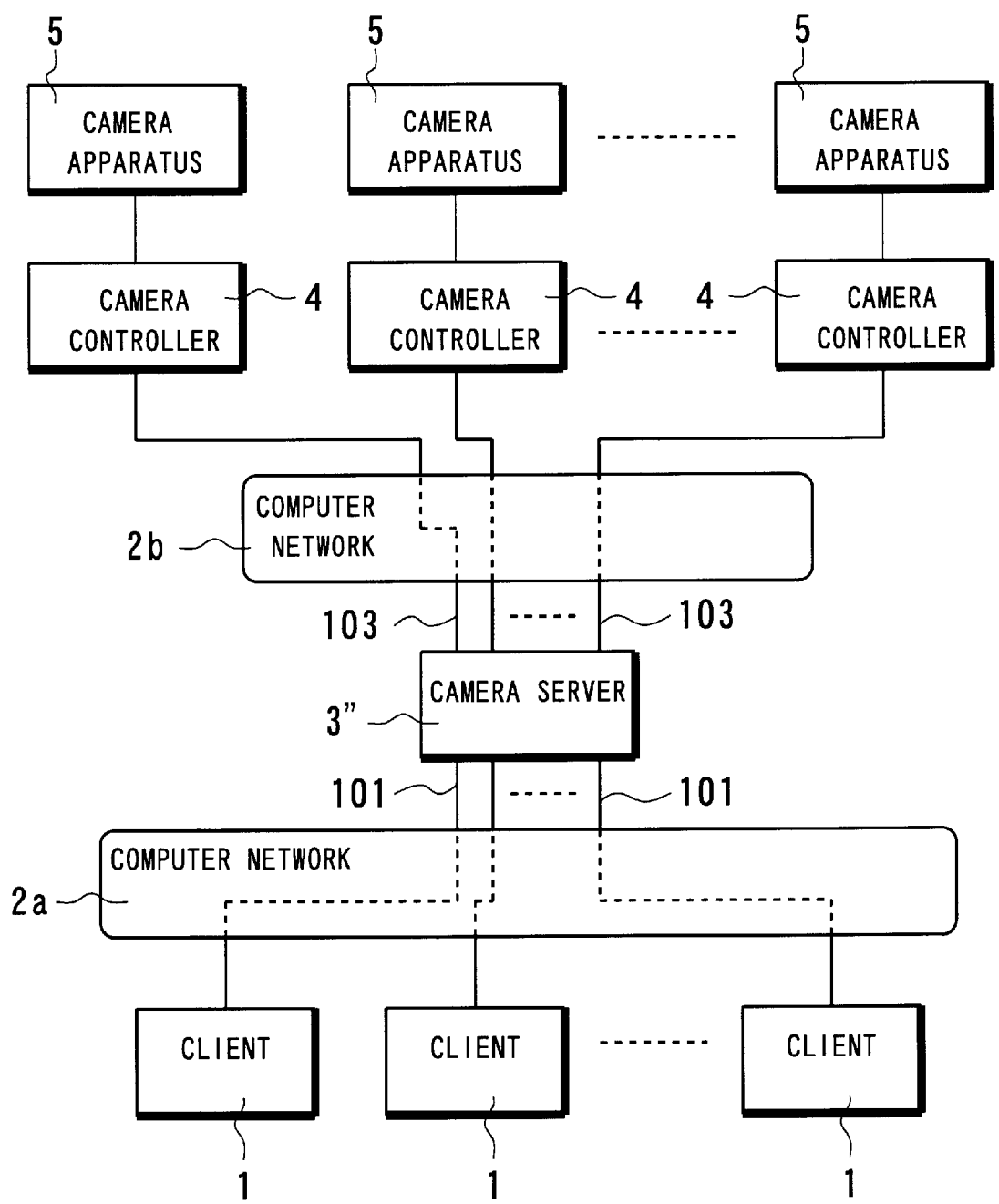
FIG. 19 is a block diagram showing the overall configuration of a remote-controlled camera-picture broadcast system according to a fifth embodiment of the present invention.

FIG. 19 shows a remote-controlled camera-picture broadcast system according to a fifth embodiment of the present invention, which has the same configuration as the first embodiment except that a plurality of camera apparatuses 5 and a plurality of camera controllers 4 are equipped.

The camera apparatuses 5 are directly connected to the corresponding camera controllers 4. The camera controllers 4 are connected to a camera server 3" through the computer network 2b.

SIXTH EMBODIMENT

Figure 20:
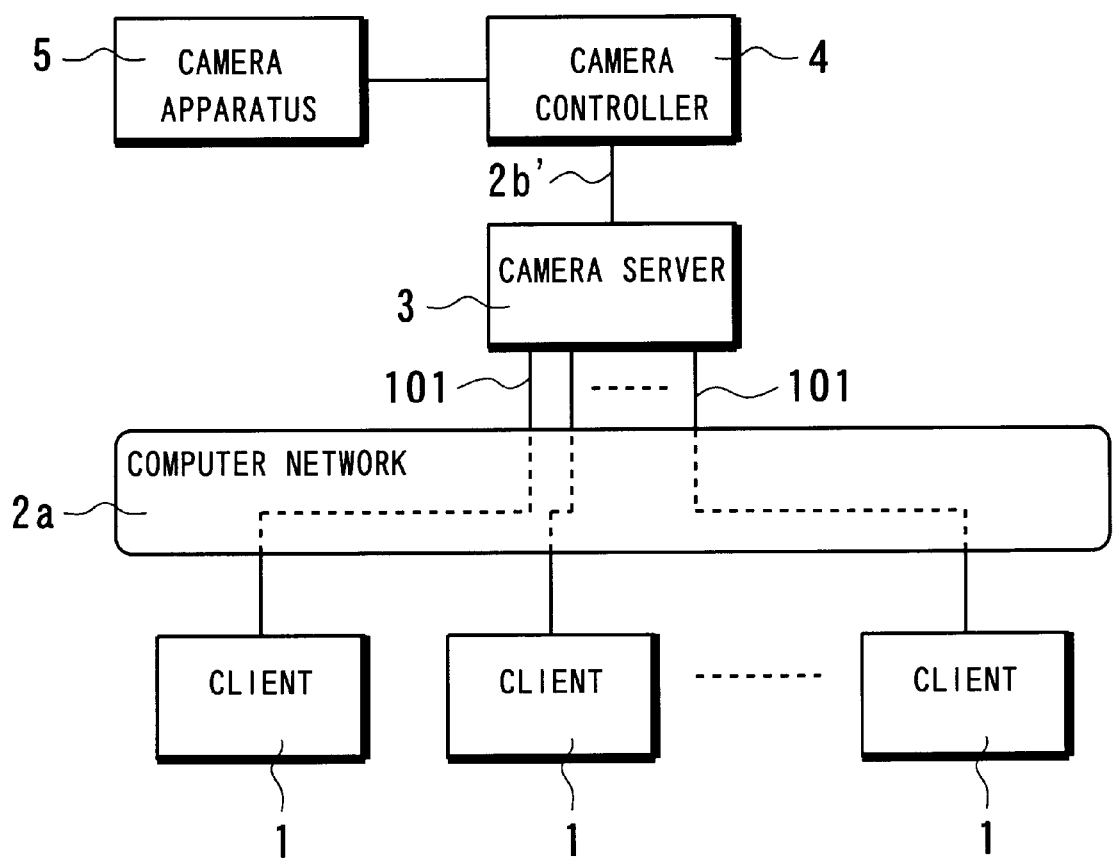
FIG. 20 is a block diagram showing the overall configuration of a remote-controlled camera-picture broadcast system according to a sixth embodiment of the present invention.

FIG. 20 shows a remote-controlled camera-picture broadcast system according to a sixth embodiment of the present invention, which has the same configuration as the first embodiment except that the camera controller 4 is connected to the camera server 3 through a RS232C cable 2b'. This cable 2' is included in the network in this specification.

In the above-described first to sixth embodiments, only the picture data acquired by the camera apparatus or apparatuses 5 is used as the operation result. However, it is needless to say that any other data such as the weather or sight-seeing information may be added to the operation result by the camera controller 4 or the camera server 3, and that the picture data and the added data may be designed to be watched on the display devices 12 in the clients 1 or 1'.

In the remote-controlled camera-picture broadcast system according to the present invention, any network such as public telephone networks, packet switched networks, and so on may be used if it is capable of inter-terminal communication or data-transmission.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A remote-controlled camera-picture broadcast system comprising:

a camera apparatus for acquiring a picture and producing a video signal of said picture;

a camera controller for controlling said camera apparatus;

a camera server connected to said camera controller through a first network, said first network being capable of inter-terminal communication or inter-terminal data transmission;

clients connected to said camera server through a second network;

wherein a said client may transmit an operation demand for said camera apparatus to said camera server through said second network according to an input of a user;

said camera server receiving said operation demand transmitted from said client corresponding to the input of the user and transmitting an operation command corresponding to said operation demand, received from said client to said camera controller through said first network;

said camera controller controlling said camera apparatus according to said operation command transmitted from said camera server so that said camera apparatus acquires a picture and produces a video signal of said picture;

said camera controller receiving said video signal corresponding to said picture produced by said camera apparatus, converting said video signal to a picture data, and transmitting said picture data to said camera server through said first network; and said camera server transmitting, through said second network, said picture data to said client from which said operation demand has been transmitted, thereby displaying said picture corresponding to said picture data on a screen.

2. The system as claimed in claim 1, wherein each of said first and second networks is a computer network.

3. The system as claimed in claim 1, wherein said first network is a computer network and said second network is the Internet.

4. The system as claimed in claim 1, wherein said first network comprises a cable.

5. The system as claimed in claim 1, further including a further camera apparatus controlled by said camera controller.

6. The system as claimed in claim 1, wherein said camera controller and said camera server are located at different locations.

7. The system as claimed in claim 6, wherein said first network comprises a cable.

* * * * *